(12) United States Patent
Hirota et al.

(10) Patent No.: US 10,659,745 B2
(45) Date of Patent: May 19, 2020

(54) VIDEO DISPLAY DEVICE AND VIDEO DISPLAY METHOD

(71) Applicant: PANASONIC INTELLECTUAL PROPERTY MANAGEMENT CO., LTD., Osaka (JP)

(72) Inventors: Takeshi Hirota, Osaka (JP); Susumu Miyajima, Osaka (JP); Akira Yoneda, Osaka (JP); Yoshiichiro Kashiwagi, Kyoto (JP); Toshiroh Nishio, Osaka (JP); Masayuki Kozuka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/349,923

(22) PCT Filed: Feb. 26, 2018

(86) PCT No.: PCT/JP2018/006864
§ 371 (c)(1),
(2) Date: May 14, 2019

(87) PCT Pub. No.: WO2019/053916
PCT Pub. Date: Mar. 21, 2019

(65) Prior Publication Data
US 2019/0335149 A1    Oct. 31, 2019

Related U.S. Application Data

(60) Provisional application No. 62/580,918, filed on Nov. 2, 2017, provisional application No. 62/558,092, filed on Sep. 13, 2017.

(51) Int. Cl.
*H04N 9/73* (2006.01)
*H04N 9/68* (2006.01)
(Continued)

(52) U.S. Cl.
CPC ............... *H04N 9/73* (2013.01); *H04N 5/20* (2013.01); *H04N 5/66* (2013.01); *H04N 5/92* (2013.01); *H04N 9/68* (2013.01); *H04N 21/431* (2013.01)

(58) Field of Classification Search
CPC .. H04N 5/66; H04N 5/92; H04N 9/68; H04N 21/431
See application file for complete search history.

(56) References Cited

U.S. PATENT DOCUMENTS

| 2001/0043042 A1 | 11/2001 | Murazaki et al. |
| 2009/0153454 A1 | 6/2009 | Irie et al. |

(Continued)

FOREIGN PATENT DOCUMENTS

| JP | 2000-035774 A | 2/2000 |
| JP | 2017-184249 A | 10/2017 |

OTHER PUBLICATIONS

Non-Final Office Action issued in U.S. Appl. No. 16/349,931, dated Oct. 10, 2019.

(Continued)

*Primary Examiner* — Edward Park
(74) *Attorney, Agent, or Firm* — McDermott Will & Emery LLP

(57) ABSTRACT

A video display device includes: a video receiver that obtains video data including a video and dynamic luminance characteristics indicating a time-dependent change in luminance characteristics of the video; a tone mapping processor that, in the case where a luminance region having a luminance less than or equal to a first luminance is defined as a low luminance region, and a luminance region having a luminance exceeding the first luminance is defined as a high luminance region, (i) performs first tone mapping using first conversion characteristics when first luminance characteristics exceed a predetermined threshold value, and (ii) per- (Continued)

forms second tone mapping using second conversion characteristics when the first luminance characteristics are less than or equal to the predetermined threshold value.

7 Claims, 25 Drawing Sheets

(51) Int. Cl.
*H04N 5/20* (2006.01)
*H04N 5/66* (2006.01)
*H04N 5/92* (2006.01)
*H04N 21/431* (2011.01)

(56) References Cited

U.S. PATENT DOCUMENTS

| | | | |
|---|---|---|---|
| 2012/0268504 | A1 | 10/2012 | Irie et al. |
| 2014/0210847 | A1* | 7/2014 | Knibbeler ............ G11B 20/10 345/589 |
| 2015/0002559 | A1* | 1/2015 | Fujine ................ G09G 3/3413 345/690 |
| 2016/0205372 | A1* | 7/2016 | Liu ......................... H04N 5/20 |
| 2017/0105042 | A1 | 4/2017 | Toma et al. |
| 2017/0134642 | A1 | 5/2017 | Yoshikawa et al. |
| 2018/0150946 | A1* | 5/2018 | Roffet ..................... G06T 5/009 |
| 2019/0311694 | A1* | 10/2019 | Van Mourik ............. G06T 5/50 |
| 2019/0311695 | A1* | 10/2019 | Stauder ................... G09G 5/10 |

OTHER PUBLICATIONS

International Search Report and Written Opinion dated May 1, 2018 in International (PCT) Application No. PCT/JP2018/006864; with partial English translation.

International Search Report and Written Opinion dated Apr. 10, 2018 in International (PCT) Application No. PCT/JP2018/006865; with partial English translation.

White Paper Blu-ray Disc Read-Only Format (Ultra HD Blu-ray), Audio Visual Application Format Specifications for BD-ROM Version 3.1, Aug. 2016, http://www.blu-raydisc.com/Assets/Downloadablefile/BD-ROM_Part3_V3.1_WhitePaper_160729_clean.pdf.

Final Office Action issued in U.S. Appl. No. 16/349,931, dated Feb. 10, 2020.

* cited by examiner

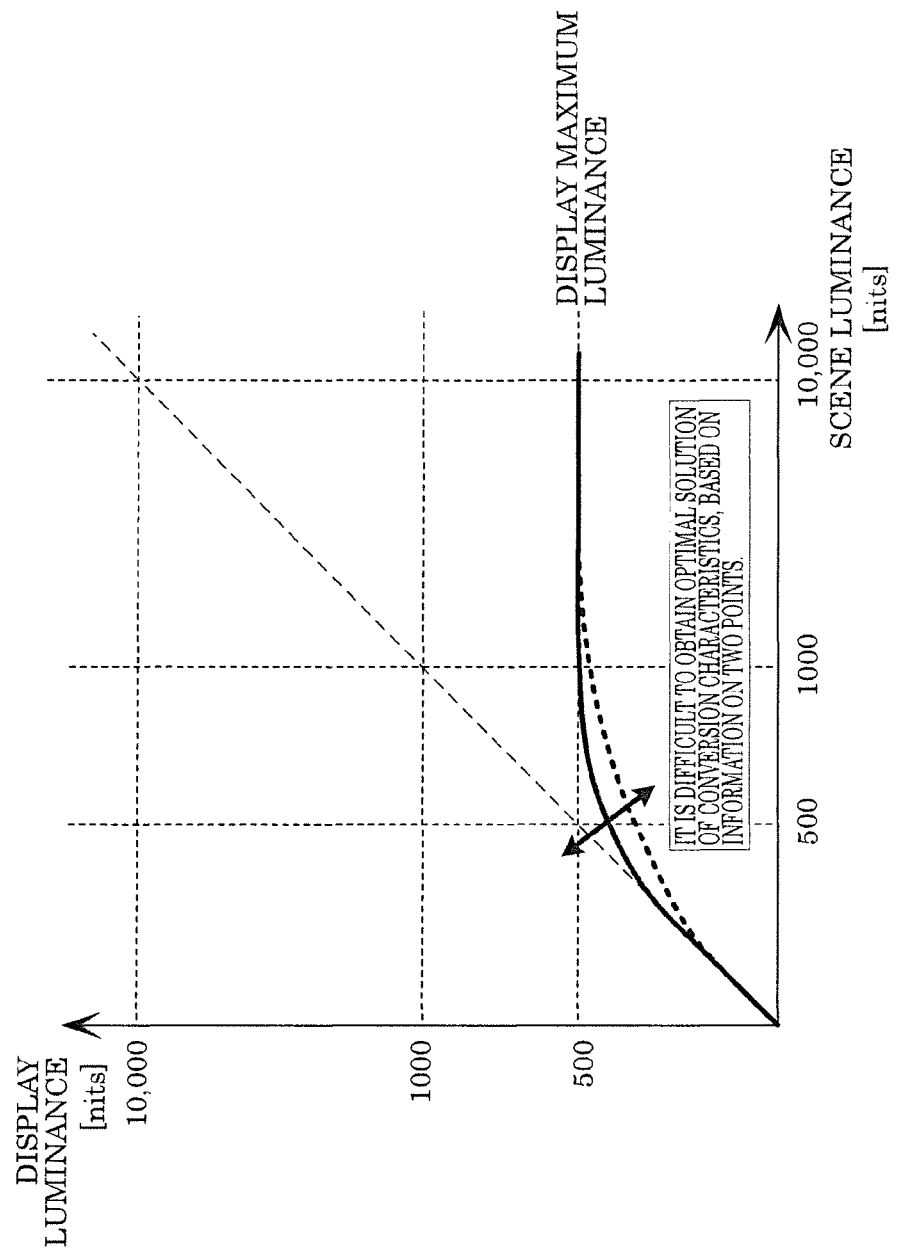

FIG. 7

| DYNAMIC METADATA | CONTENT |
|---|---|
| 99Y | MAXIMUM LUMINANCE VALUE THAT IS ACCUMULATED FROM LOW LUMINANCE SIDE IN LUMINANCE HISTOGRAM AND IS IN RANGE NOT EXCEEDING 99.99% |
| 18G | FOLLOWING CONDITIONS<br>· CONSTRUCT CUMULATIVE HISTOGRAM HAVING INTERVALS OF 50 NIT (50-NIT CUMULATIVE HISTOGRAM) WITH TARGET LUMINANCE AS START POINT, BASED ON LUMINANCE HISTOGRAM<br>· CALCULATE POINT AT WHICH CUMULATIVE VALUE IS MAXIMUM IN 50-NIT CUMULATIVE HISTOGRAM, AND LUMINANCE VALUE OF THE POINT<br>· INCREASE LUMINANCE FROM THE LUMINANCE VALUE, AND DETERMINE, AS 18G, LUMINANCE VALUE THAT FIRST FALLS SHORT OF 10% OF MAXIMUM LUMINANCE VALUE<br>· WHEN LUMINANCE DISTRIBUTION FROM 0 NIT TO 18G EXCEEDS 80% OF ENTIRE LUMINANCE DISTRIBUTION, USE 18G AS VALID VALUE, AND WHEN NOT, USE 18G AS INVALID VALUE |
| maxRGB Percentile (1%, 25%, 50%, 75%, 90%, 95%, 99.98%) | VALUES CALCULATED BY FOLLOWING CALCULATIONS<br>· NORMALIZE VALUE OBTAINED BY EOTF CONVERTING EACH PIXEL RGB OF SCREEN<br>· CONSTRUCT HISTOGRAM OF MAXIMUM VALUE (maxRGB) OF RGB VALUES NORMALIZED FOR EACH PIXEL<br>· VALUE WHEN PIXEL AREA IS ACCUMULATED FROM 0 AND COUNTED PIXEL AREA REACHES FOLLOWING VALUE (1%, 25%, 50%, 75%, 90%, 95%, 99.98%) |
| averrage maxRGB | VALUE OBTAINED BY AVERAGING maxRGB VALUES FOR EACH PIXEL BY ENTIRE SCREEN |
| knee_point_x | INDICATE RANGE OF LINEAR PORTION IN TONE MAP<br>LINEAR FROM (0, 0) TO (knee_point_x, knee_point_y) |
| knee_point_y | DITTO |
| Bezier_anchor (0-9) | BEZIER COEFFICIENT FOR DETERMINING TONE MAP IN REGION ABOVE (knee_point_x, knee_point_y) |
| DY100 | IN LUMINANCE HISTOGRAM FOR ENTIRE SCREEN, PROPORTION OF PIXELS HAVING LUMINANCE LESS THAN OR EQUAL TO 100 NIT TO TOTAL PIXELS |

VIDEO DISPLAY DEVICE AND VIDEO DISPLAY METHOD

CROSS-REFERENCE OF RELATED APPLICATIONS

This application is the U.S. National Phase under 35 U.S.C. § 371 of International Patent Application No. PCT/JP2018/006864, filed on Feb. 26, 2018, which in turn claims the benefit of U.S. Provisional Application No. 62/558,092, filed on Sep. 13, 2017 and U.S. Provisional Application No. 62/580,918, filed on Nov. 2, 2017, the entire disclosures of which Applications are incorporated by reference herein.

TECHNICAL FIELD

The present disclosure relates to a video display device and a video display method that process a video signal.

BACKGROUND ART

Patent Literature (PTL) 1 describes an HDR (high dynamic range) display device that updates a display method for an HDR signal according to dynamic HDR metadata.

CITATION LIST

Patent Literature

PTL 1: Japanese Unexamined Patent Application Publication No. 2017-184249

Non Patent Literature

NPL 1: White Paper Blu-ray Disc Read-Only Format (Ultra HD Blu-ray), Audio Visual Application Format Specifications for BD-ROM Version 3.1, August 2016 (http://www.blu-raydisc.com/Assets/Downloadablefile/BD-ROM_Part3_V3.1_WhitePaper_160729_clean.pdf)

SUMMARY OF THE INVENTION

Technical Problem

The present disclosure provides a video display device and a video display method that can improve the quality of a video displayed.

Solution to Problem

A video display device according to one aspect of the present disclosure includes: an obtainer that obtains video data including a video and dynamic luminance characteristics indicating a time-dependent change in luminance characteristics of the video; a tone mapping processor that, in the case where a luminance region having a luminance less than or equal to a first luminance is defined as a low luminance region, and a luminance region having a luminance exceeding the first luminance is defined as a high luminance region, (i) performs first tone mapping using first conversion characteristics when first luminance characteristics exceed a predetermined threshold value, and (ii) performs second tone mapping using second conversion characteristics when the first luminance characteristics are less than or equal to the predetermined threshold value, the first luminance characteristics being included in the dynamic luminance characteristics and indicating the number of pixels having luminances less than or equal to a second luminance among pixels included in the low luminance region in one frame of the video, the first tone mapping maintaining the luminances less than or equal to the second luminance, the second tone mapping decreasing the luminances less than or equal to the second luminance; and a display that displays a video obtained as a result of the first tone mapping or the second tone mapping.

Advantageous Effect of Invention

The present disclosure can provide a video display device and a video display method that can improve the quality of a video displayed.

BRIEF DESCRIPTION OF DRAWINGS

FIG. 6 is a graph showing a relationship between the luminance of a video inputted and luminance outputted from an actual display.
FIG. 7 is a table showing an example of dynamic metadata.

DESCRIPTION OF EXEMPLARY EMBODIMENT(S)

[1-1. Background]

Figure 1:
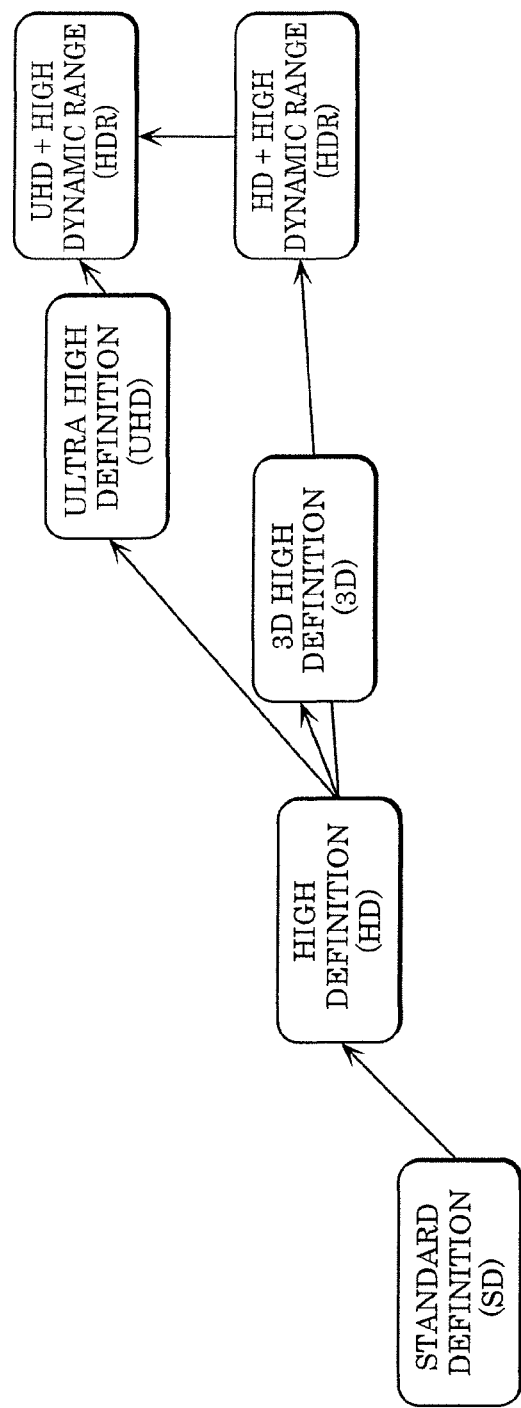
FIG. 1 is a diagram for illustrating the evolution of video technology.

First, the evolution of video technology will be described with reference to FIG. 1. FIG. 1 is a diagram for illustrating the evolution of video technology.

The video quality has so far been enhanced with a view to increasing the number of display pixels. Not only standard definition (SD) videos having a resolution of 720×480 pixels but also high definition (HD) videos having a resolution of 1920×1080 pixels are widely used.

In recent years, in order to further enhance the video quality, the introduction of ultra high definition (UHD) videos having a resolution of 3840×1920 pixels or 4K resolution of 4096×2048 pixels, that is, 4K videos has started.

Along with the introduction of 4K, the following has been considered: the expansion of the dynamic range, the expansion of the color gamut, the addition or improvement of the frame rate, etc.

Among these, regarding the dynamic range, HDR (high dynamic range) has gained attraction as a technique of representing bright light, such as specular reflection light that cannot be represented with the current television signals, at a brightness level closer to reality while maintaining a dark part tone. Specifically, conventional television signals are called SDR (standard dynamic range) signals, and have the maximum luminance of 100 nit. In contrast, in HDR, the maximum luminance is assumed to increase up to at least 1000 nit. The SMPTE (Society of Motion Picture & Television Engineers), the ITU-R (International Telecommunications Union Radiocommunication Sector), etc. are currently standardizing mastering display standards for HDR.

As with HD and UHD, examples of specific applications of HDR include broadcasting, packaged media (e.g. Blu-ray (registered trademark) disc), and Internet delivery.

[1-2. Relationship Among Creation of Master, Delivery Methods, and Display Devices]

Figure 2:
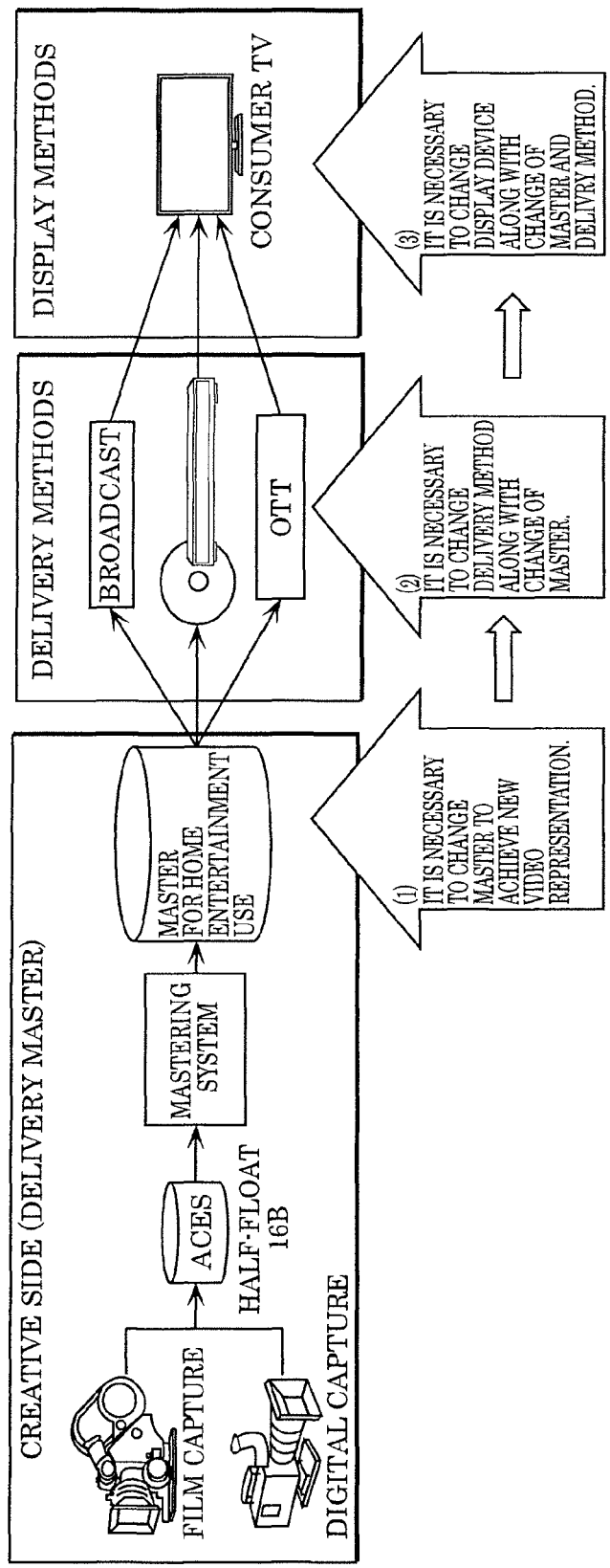
FIG. 2 is a diagram for illustrating a relationship among video production, delivery methods, and display devices when a new video representation is introduced into content.

FIG. 2 is a diagram for illustrating a relationship among video production, delivery methods, and display devices when a new video representation is introduced into content.

When a new video representation (e.g. an increase in the number of pixels) is introduced to enhance the video quality, as shown in FIG. 2, it is necessary to (1) change a master for home entertainment produced by a video producer. In response, it is also necessary not only to (2) update a delivery method, such as broadcasting, communication, and a packaged medium, but also to (3) update a display device that displays the video, such as a television or a projector.

[1-3. Tone Mapping]

Tone mapping is a process of limiting, according to a relationship between the luminance of an HDR video and the maximum luminance (display peak luminance: DPL) of a video display device, the luminance of a video to be less than or equal to DPL by converting the luminance of the video when the maximum luminance (maximum content luminance level: MaxCLL) of the video exceeds DPL. This process makes it possible to display the video without losing information about luminance in the vicinity of the maximum luminance of the video. Since this conversion depends not only on the characteristics of video display devices but also on how videos are displayed, different conversion characteristics are used for each video display device.

Figure 3A:
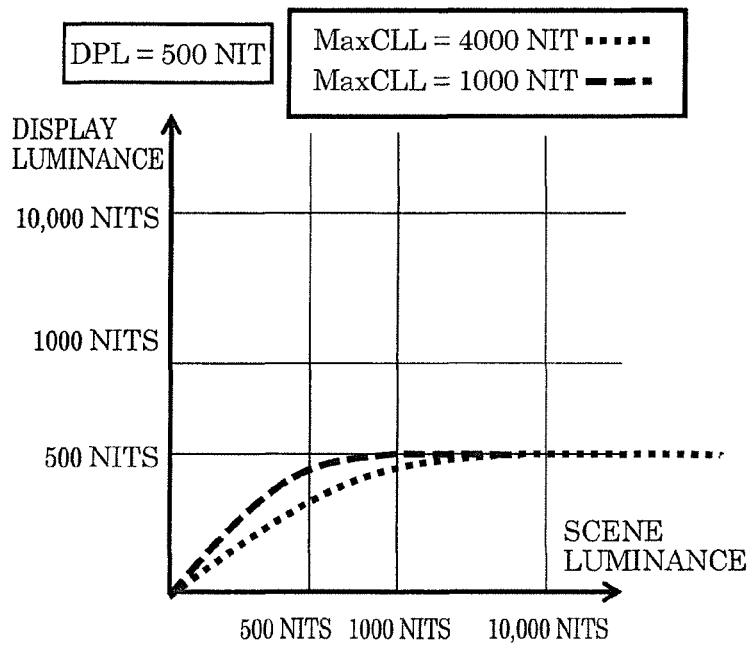
FIG. 3A is a graph showing an example of a tone map.
Figure 3B:
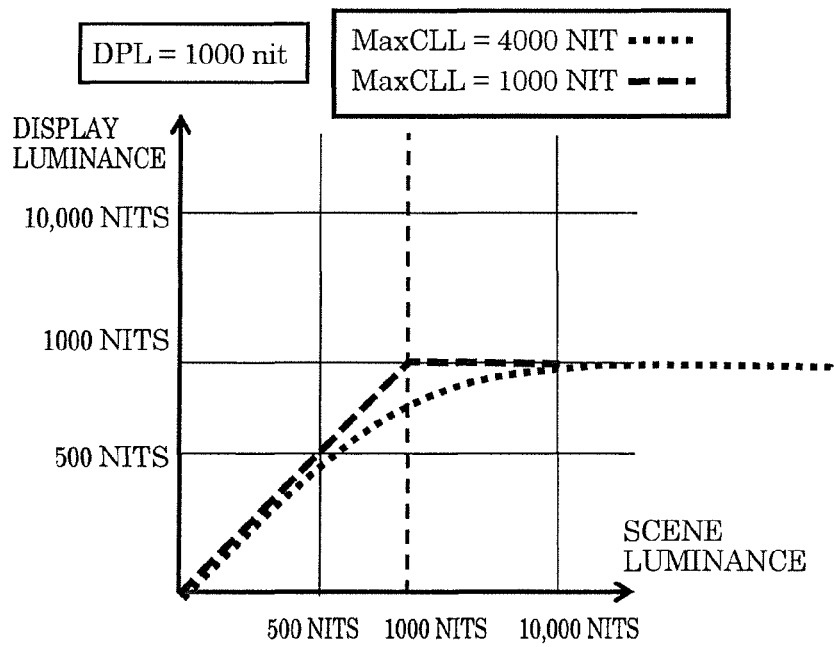
FIG. 3B is a graph showing an example of a tone map.

FIG. 3A and FIG. 3B each are a graph showing an example of a tone map. FIG. 3A shows a case in which DPL is 500 nit, and FIG. 3B shows a case in which DPL is 1000 nit. Moreover, FIG. 3A and FIG. 3B show a tone map when a video having MaxCLL of 1000 nit is displayed, and a tone map when a video having MaxCLL of 4000 nit is displayed, respectively.

As shown in FIG. 3A, when DPL is 500 nit, the luminance of both videos is converted so that both videos can be displayed at a luminance up to MaxCLL but not greater than 500 nit. However, the degree of conversion is greater for one of the videos having higher MaxCLL.

As shown in FIG. 3B, when DPL is 1000 nit, tone mapping is not performed on the video having MaxCLL of 1000 nit. Tone mapping is performed on the video having MaxCLL of 4000 nit to convert the luminance from 4000 nit to 1000 nit, and the video is displayed at 1000 nit.

[1-4. Dynamic Metadata and Dynamic Tone Map]

Figure 4A:
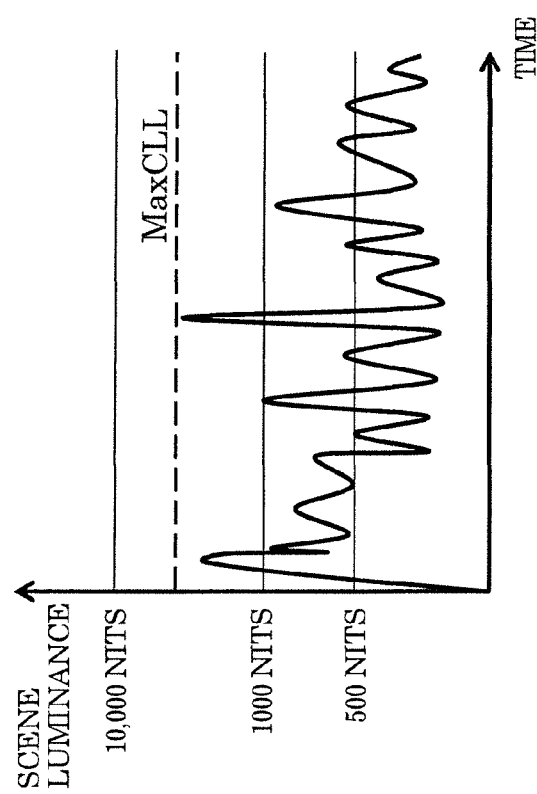
FIG. 4A is a graph showing an example of a static tone map.
Figure 4B:
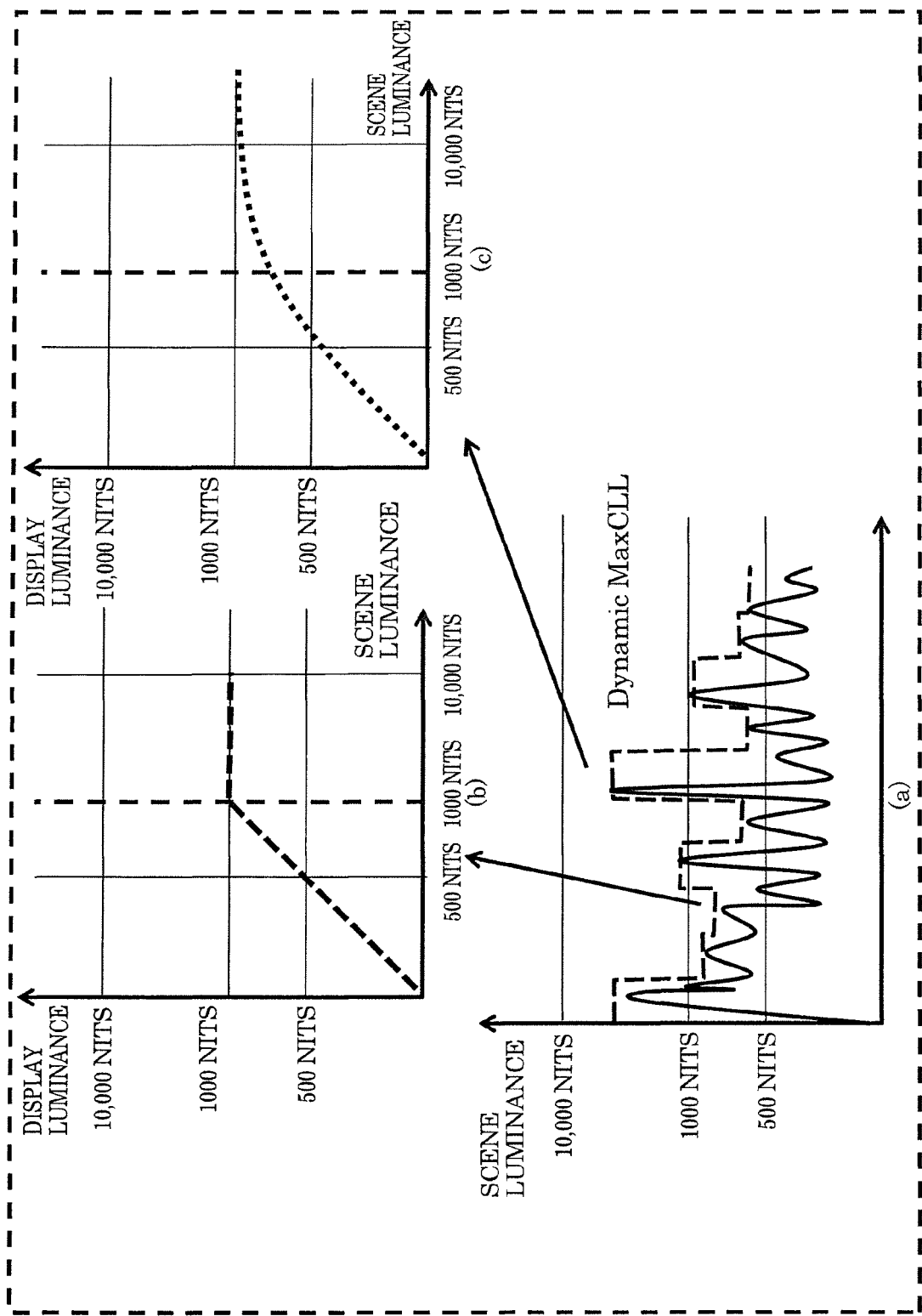
FIG. 4B is a diagram showing an example of a dynamic tone map.

FIG. 4A is a graph showing an example of a tone map in which static metadata is used. FIG. 4B is a diagram showing an example of a dynamic tone map in which dynamic metadata is used.

As shown in FIG. 4A, when static metadata (MaxCLL) is used, since MaxCLL shows the maximum luminance in a series of videos, a video display device can perform only static tone mapping on the series of videos. In contrast, as shown in (a) in FIG. 4B, when metadata (here referred to as Dynamic MaxCLL) suited to time-variable luminance is used, the video display device does not perform tone mapping when the luminance is low ((b) in FIG. 4B), and performs tone mapping when the luminance is high ((c) in FIG. 4B). In this manner, the video display device can achieve optimal tone mapping suited to the time-variable luminance. Dynamic metadata is dynamic luminance characteristics indicating a time-dependent change in the luminance characteristics of a video. The luminance characteristics of the video used as the dynamic metadata may be the maximum luminance, the average luminance, etc. in each predetermined section of the video. In the present disclosure, the luminance characteristics of a video will be described as an example of the maximum luminance of the video. Examples of a predetermined section of a video include a scene, a chapter, and a frame.

[1-5. EOTF]

Here, EOTF will be described with reference to FIG. 5A and FIG. 5B.

Figure 5A:
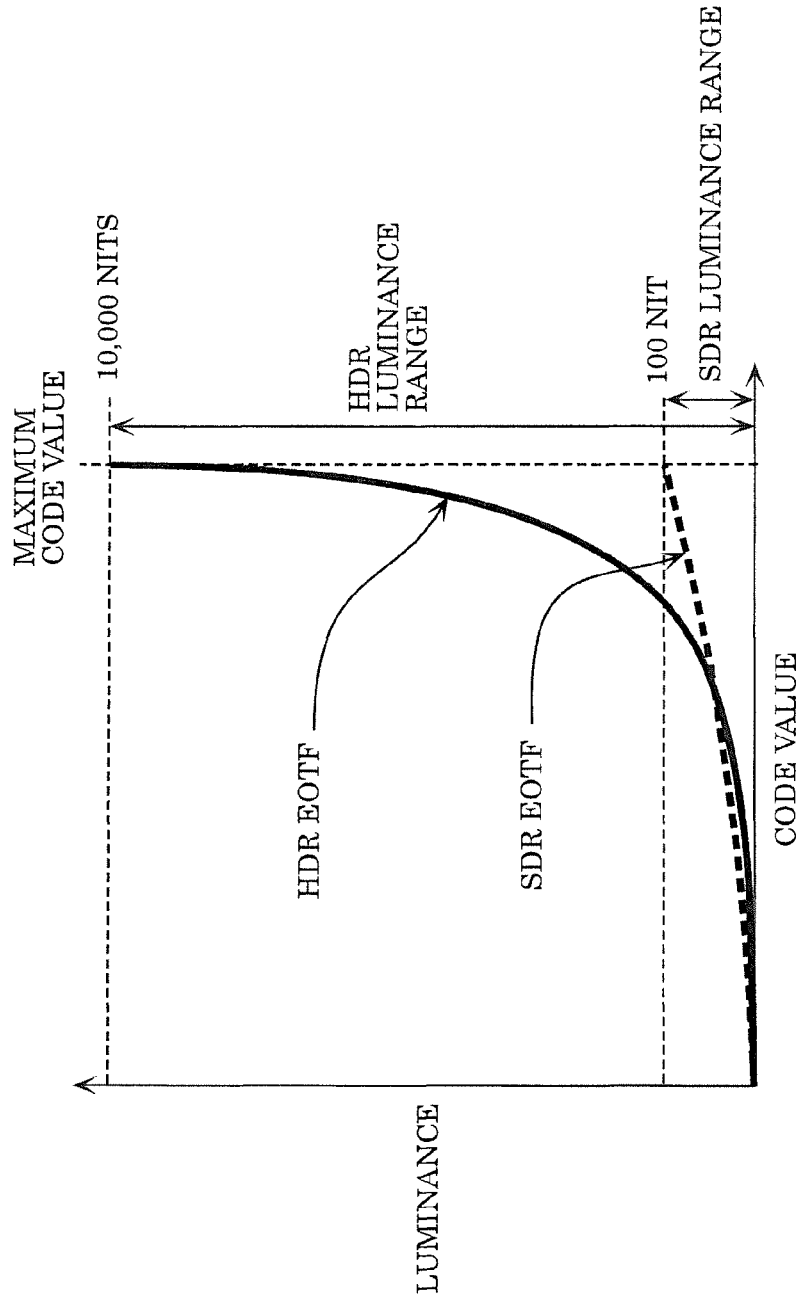
FIG. 5A is a graph showing an example of an EOTF (electro-optical transfer function) corresponding to each of HDR and SDR.

FIG. 5A is a graph showing an example of an EOTF (electro-optical transfer function) corresponding to each of HDR and SDR.

EOTF is generally referred to as gamma curve, indicates correspondence between code values and luminance values, and is used to convert a code value into a luminance value.

In other words, EOTF is relationship information indicating a correspondence relationship between code values and luminance values.

Figure 5B:
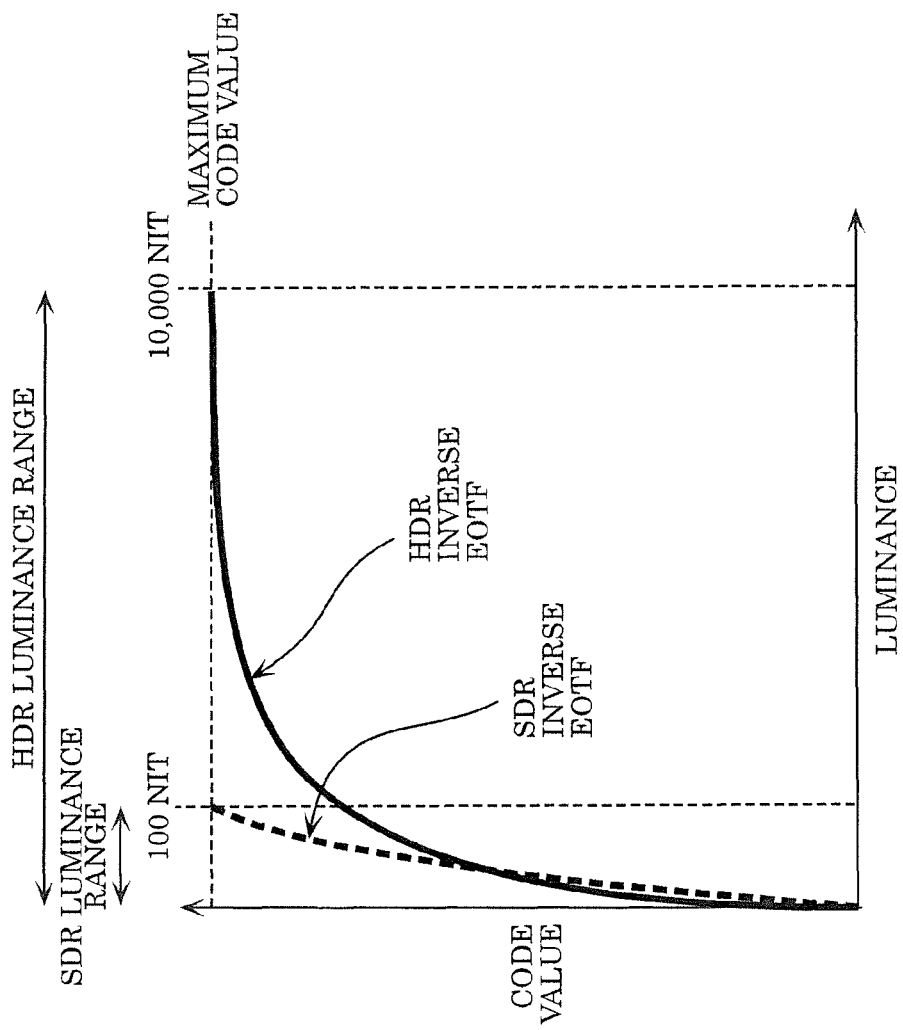
FIG. 5B is a graph showing an example of an inverse EOTF corresponding to each of HDR and SDR.

FIG. 5B is a graph showing an example of an inverse EOTF corresponding to each of HDR and SDR.

Inverse EOTF indicates a correspondence between luminance values and code values, and is used to quantize and convert a luminance value into a code value inversely with EOTF. In other words, inverse EOTF is relationship information indicating a correspondence relationship between luminance values and code values. For example, when the luminance values of an HDR-compatible video are represented by code values having 10-bit tones, luminance values in an HDR luminance range up to 10000 nit are quantized and mapped to 1024 integer values ranging from 0 to 1023. In other words, the luminance values (the luminance values of the HDR-compatible video) in the luminance range from 0 to 10000 nit are converted into HDR signals that are 10-bit code values by being quantized in accordance with the inverse EOTF. HDR-compatible EOTF (hereinafter referred to as "HDR EOTF") or HDR-compatible inverse EOTF (hereinafter referred to as "HDR inverse EOTF") makes it possible to represent a luminance value higher than SDR-compatible EOTF (hereinafter referred to as "SDR EOTF") or SDR-compatible inverse EOTF (hereinafter referred to as "SDR inverse EOTF"). For example, in FIG. 5A and FIG. 5B, the maximum value of luminance (peak luminance) is 10000 nit. In other words, the HDR luminance range encompasses an SDR luminance range, and an HDR peak luminance is greater than an SDR peak luminance. The HDR luminance range is a luminance range having the peak luminance that is increased from 100 nit, which is the peak luminance of the SDR luminance range, to 10000 nit.

Examples of the HDR EOTF and the HDR inverse EOTF include SMPTE 2084 standardized by the Society of Motion Picture and Television Engineers (SMPTE).

[1-6. Conventional Techniques]

In the conventional techniques, metadata indicating single maximum luminance information is shown for whole content, and a display process is performed using a tone map configured for single content. Accordingly, conventional video display devices perform tone mapping that adjusts the maximum luminance of content indicated by maximum luminance information to the display maximum luminance of the video display devices such that, for example, even when a dark scene includes no high luminance information, the video display devices can display the scene at luminance up to high luminance.

This problem, however, can be solved by giving dynamic metadata indicating luminance information for each scene to the video display devices. In other words, the video display devices can perform optimal tone mapping for each scene using the dynamic metadata, thereby improving luminance and tones.

[1-6-1. Problem 1]

As stated above, the problem of the conventional techniques can be solved by using the dynamic range of luminance for each scene.

However, merely using maximum luminance information as shown in FIG. 6 does not lead to find an optimal way of specifically drawing conversion characteristics for use in tone map, and may cause loss of luminance or tones depending on content.

[1-6-2. Solution to Problem 1]

In view of the above, the present disclosure defines dynamic metadata for optimizing conversion characteristics for use in tone map, and describes an algorithm for creating conversion characteristics for use in tone map in accordance with the dynamic metadata. By optimizing a tone map using dynamic data or feature data of a video equivalent to the dynamic metadata, which is obtained by analyzing a main video, a video display device can display a video that achieves an optimal tone map according to a weight assigned to each luminance of the video.

The details will be described as an embodiment below.

It should be noted that FIG. 6 is a graph showing a relationship between the luminance (Scene Luminance) of a video inputted and luminance (Display Luminance) outputted from an actual display. In other words, FIG. 6 shows conversion characteristics for use in tone map.

[1-7. Dynamic Metadata]

FIG. 7 is a table showing an example of dynamic metadata.

The dynamic metadata includes information shown in FIG. 7.

Specifically, the dynamic metadata includes 99Y, 18G, maxRGB Percentile (1%), maxRGB Percentile (25%), maxRGB Percentile (50%), maxRGB Percentile (75%), maxRGB Percentile (90%), maxRGB Percentile (95%), (99.98%), average max RGB, knee_point_x, knee_point_y, Bezier_anchor (0-9), and DY100. In particular, the dynamic metadata may include 99Y and DY100.

The dynamic metadata may be information indicating the luminance characteristics of each of frames included in a main video, and information indicating luminance characteristics for each scene per frame. It should be noted that when the dynamic metadata is the information indicating the luminance characteristics for each scene, the dynamic metadata may be the maximum value or average value of the luminance characteristics of the frames included in each scene.

Figure 8:
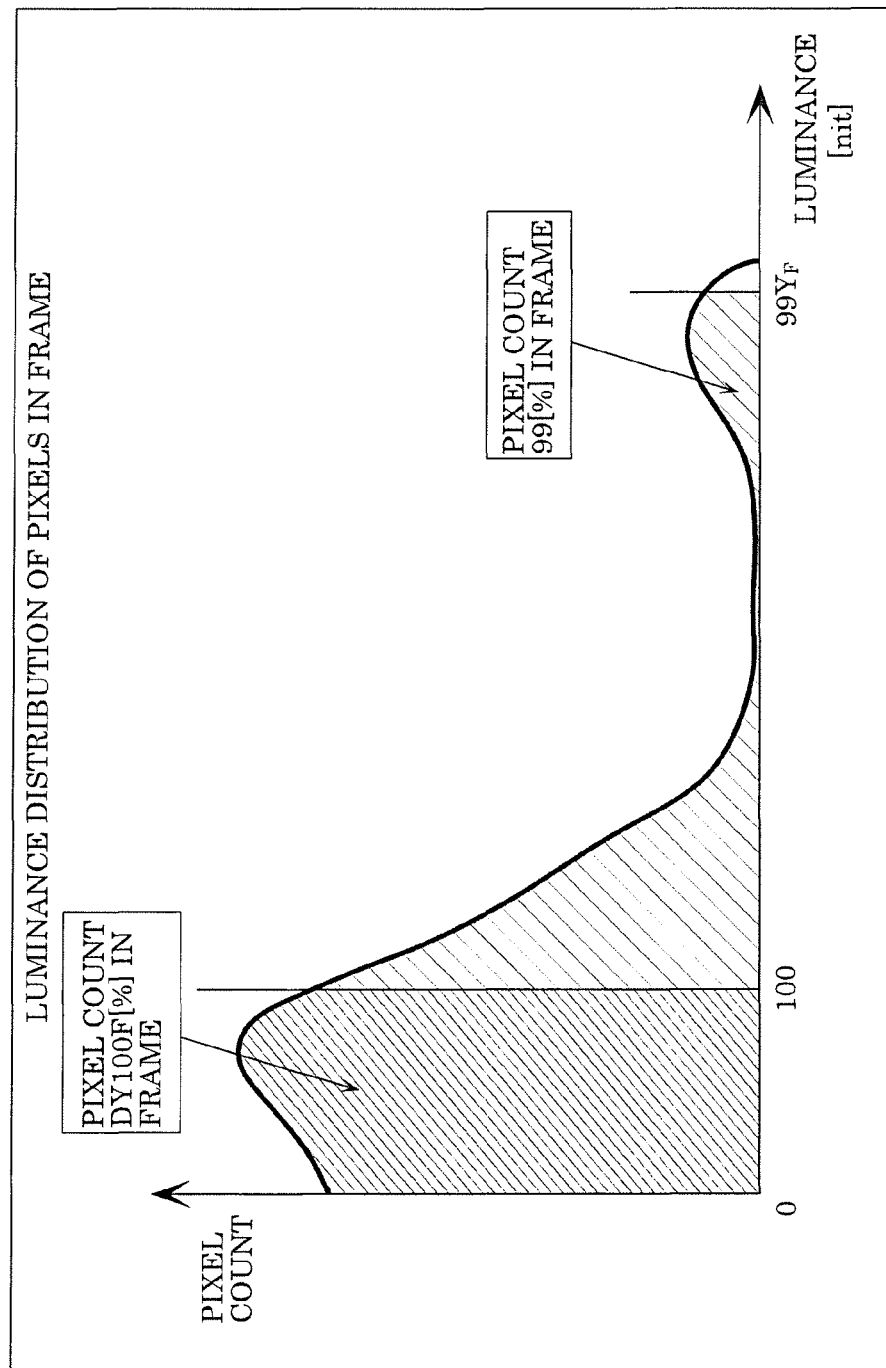
FIG. 8 is a graph for illustrating a method of calculating 99Y and DY100.
Figure 9:
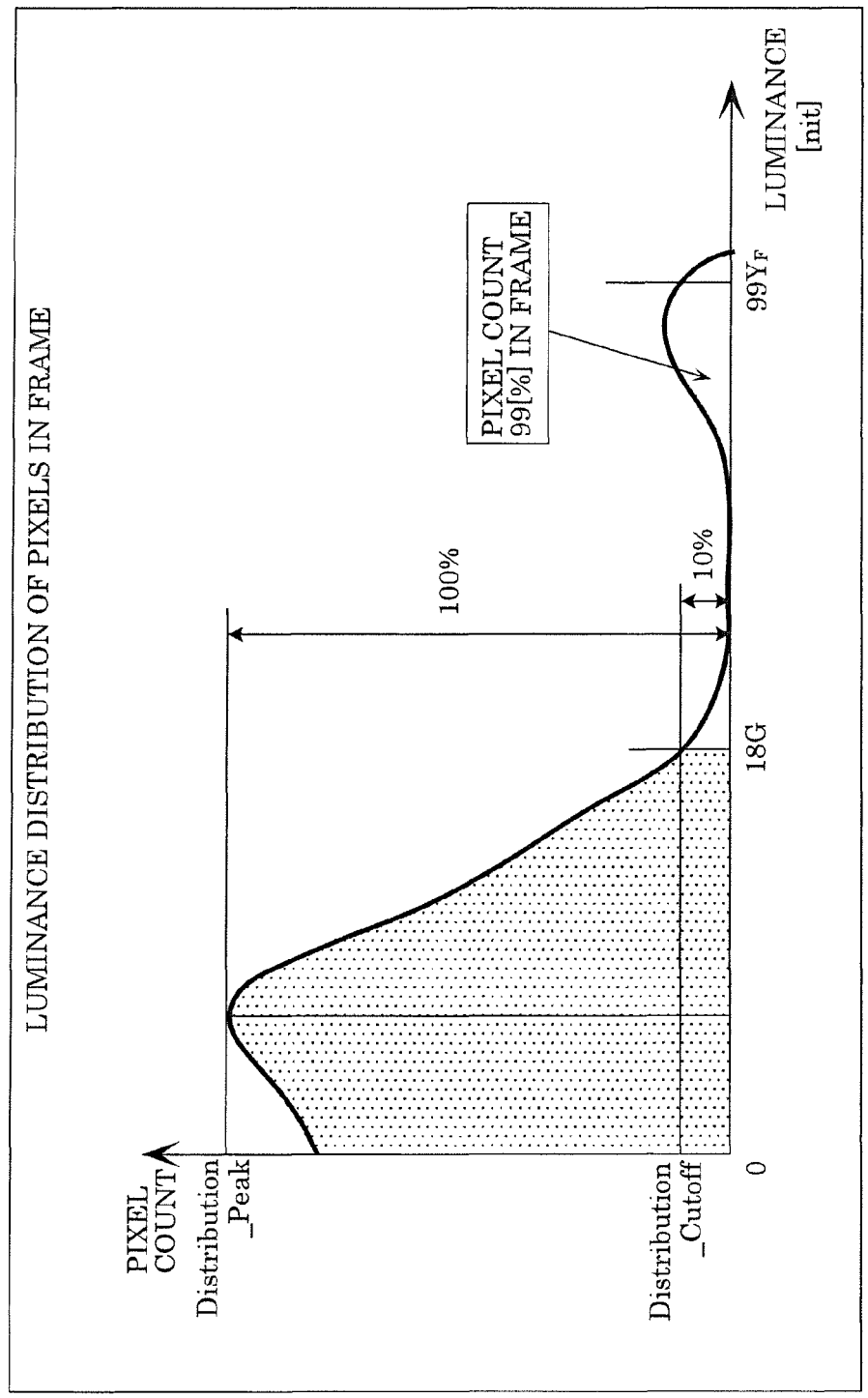
FIG. 9 is a graph for illustrating a method of calculating 18G.

The following illustrates, as an example, a case in which the dynamic metadata is information indicating luminance characteristics for each scene. FIG. 8 is a graph for illustrating a method of calculating 99Y and DY100. FIG. 9 is a graph for illustrating a method of calculating 18G. FIG. 8 and FIG. 9 each are a graph showing the luminance distribution of pixels in one frame.

As shown in FIG. 8, $99Y_F$ indicates the maximum luminance value in a range not exceeding 99.99% when all the pixels in one frame are accumulated from a low luminance side of a luminance histogram showing a relationship between luminances and the number of pixels having the luminances. 99Y is set to the maximum value among $99Y_F$ of frames constituting a scene. It should be noted that 99Y is an integer from 0 to 4095 obtained by normalizing a luminance value (0 nit to 10000 nit) to 12 bit (0 to 4095).

18G is calculated under the following conditions.

For each of frames constituting one scene, a cumulative histogram having intervals of 50 nit (50-nit cumulative histogram) is constructed with a target luminance as a start point, based on a luminance histogram of the frame.

A point at which a cumulative value is largest in the 50-nit cumulative histogram (the maximum cumulative value) and the luminance value thereof are calculated.

Luminance is increased from the luminance value, and a luminance value that first falls below 10% of the maximum cumulative value is determined as 18G.

18G when a luminance distribution from 0 nit to 18G exceeds 80% of the entire luminance distribution is determined as a valid value, and 18G when the luminance distribution does not is determined as an invalid value.

In other words, 18G is derived as a luminance value in Distribution_Cutoff shown in FIG. 9. 18G is an average of 18G of frames constituting a scene. When 18G is equal to 0, such 18G should not be included in the calculation of 18G.

It should be noted that Distribution_Cutoff is a threshold value obtained by multiplying Cutoff_Threshold and Distribution_Peak. Distribution_Peak is a pixel count at the peak of the luminance distribution of pixels in a frame. Cutoff_Threshold is, for example, 0.10. In other words, Distribution_Cutoff is 10% of the pixel count of Distribution_Peak.

maxRGB Percentile [k] is determined by the following calculation. It should be noted that k is any one of 1, 25, 50, 75, 90, 95, and 99.98.

A value obtained by EOTF converting each pixel RGB of a screen is normalized.

A histogram for the maximum value (maxRGB) of the RGB values normalized for each pixel is constructed.

A value when a pixel area is accumulated from 0 and a counted pixel area reaches a value of k % is determined as maxRGB Percentile [k].

average maxRGB is a value obtained by averaging maxRGB values for each pixel in one frame by an entire screen.

knee_point_x and knee_point_y indicate the range of a linear portion of conversion characteristics for use in tone map. In other words, the conversion characteristics are linear from (0, 0) to (knee_point_x, knee_point_y).

Bezier_anchor (0-9) indicates a Bezier coefficient for determining a tone map in a region above knee_point_x, y.

$DY100_F$ (DistributionY100 nit) indicates a proportion of pixels having luminances less than or equal to 100 nit to all the pixels in a luminance histogram for one frame. DY100F is not estimated from a "Distribution MaxRGB Percentile" value, and is the number of pixels included in one frame and accumulated in a range of 0 to 100.23 [nit] to more accurately find a distribution of pixels having low luminances. It should be noted that DY100F is derived as a percentile of pixels included in a frame and having luminances less than or equal to 100.23 nit (10 bit/[0:1023] and Y=520). DY100 is configured as an average value of DY100F of frames constituting a scene. DY100 is an integer from 0 to 100.

It should be noted that the luminance value (in nit or $cd/m^2$) of a pixel for deriving both 99Y and DY100 needs to be converted from Y by the method specified in SMPTE ST. 2084. Further, as indicated by Equation 1 below, Y'[0:1], normalized Y, needs to be converted from an R'G'B' pixel value by the method specified in ITU-T BT. 2020.

$$Y' = 0.2627R' + 0.6780G' + 0.0593B' \quad \text{(Equation 1)}$$

It should be noted that dynamic metadata is included in video data as content information, and a video reproduction device reproducing a video adds the dynamic metadata to a main video for each scene when the video is reproduced, and transmits the dynamic metadata to a video display device. The luminance characteristics of the main video corresponding to the dynamic metadata can be also obtained by analyzing the main video of content. In other words, the present disclosure includes tone mapping performed based on luminance characteristics corresponding to dynamic metadata that are obtained by the video display device analyzing the main video. The present disclosure illustrates, for example, as dynamic luminance characteristics indicating a time-dependent change in the luminance characteristics of a video, dynamic metadata and luminance characteristics obtained by analyzing a main video per frame or scene comprising frames.

(Method of Generating 18G)

To determine KneePoint in a tone map, information about a luminance distribution is needed. In particular, since kneepoint is configured by calculating the degree of concentration in a luminance histogram for entire one frame, accurate values are needed.

A percentile value is an integrated value of pixels in one frame in increasing order of luminance, and is discrete. Consequently, the percentile value indicates an area distribution of a determined luminance. For this reason, the percentile value does not sufficiently show a degree of luminance concentration. For example, when a degree of luminance concentration is determined using maxRGB Percentile [75], it is impossible to distinguish between a case in which luminance is concentrated up to 74%, and luminance away from the luminance at 74% are at 75%, and a case in which luminance is concentrated up to 75%.

For this reason, to show luminance concentration, a luminance value (Distribution_Peak_count_Luminance) indicating the maximum count and the maximum count (Distribution_Peak) are detected in a luminance histogram using 18G that enables detection of a luminance distribution the continuity of which can be determined. Moreover, a luminance value is increased from Distribution_Peak_count_Luminance, a luminance is identified at which a count falls below 10% of Distribution_Peak, and the identified luminance is referred to as 18G_measure.

The first problem in generating 18G is that in an operation based on a simple histogram, the count may momentarily be small, and a wrong value may result. In contrast, in the method of generating 18G, by constructing a luminance histogram including values of integral at intervals of 50 nit, a sensitivity to a momentary change is reduced and an optimal value is obtained.

Moreover, the second problem in generating 18G is that, even when values are used which are calculated from the luminance histogram including the values of integral at intervals of 50 nit, a degree of concentration may be small in the case of, for example, a luminance distribution that is average for an entire frame but in which the peak is high and concentrated. In response, to exclude a case in which the degree of concentration is small, a condition that an integrated value (a percentile value) up to 18G in the luminance histogram exceeds 80% is made for the obtained result. With this, an integrated value less than 80% does not reach 18G, thereby excluding the case in which the degree of concentration is small.

[1-8. Configuration]

Next, the following describes the configuration of video display device 100 according to the present embodiment.

Figure 10:
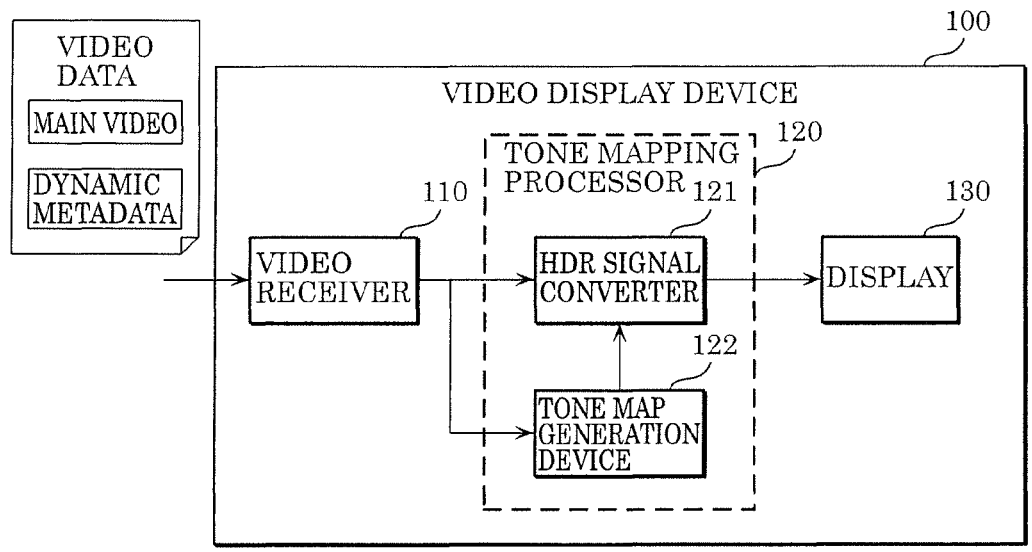
FIG. 10 is a block diagram illustrating an example of the configuration of a video display device according to an embodiment.
Figure 11:
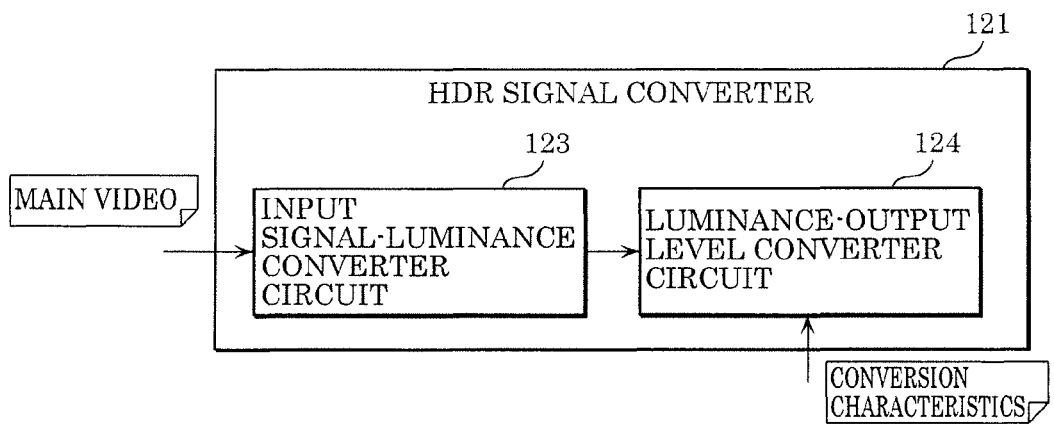
FIG. 11 is a block diagram illustrating an example of the configuration of an HDR signal converter according to the embodiment.

FIG. 10 is a block diagram illustrating an example of the configuration of the video display device according to the embodiment. FIG. 11 is a block diagram illustrating an example of the configuration of an HDR signal converter according to the embodiment.

Video display device 100 includes video receiver 110, tone mapping processor 120, and display 130.

Video receiver 110 receives video data including a main video, which is a video, and dynamic luminance characteristics. In other words, video receiver 110 serves as an obtainer that obtains video data. Video receiver 110 transmits the received video data to tone mapping processor 120.

Tone mapping processor 120 performs tone mapping using predetermined conversion characteristics. Tone mapping processor 120 includes HDR signal converter 121 and tone map generation device 122.

HDR signal converter 121 optimizes the luminance information of the main video, which is an HDR video, to the luminance of display 130, and outputs the optimized luminance information.

Moreover, as shown in FIG. 11, HDR signal converter 121 includes input signal-luminance converter circuit 123 that converts a code value indicating the luminance of the main video into luminance, and luminance-output level converter circuit 124 that converts luminance into a code value converted into the luminance of display 130. Luminance-output level converter circuit 124 performs tone mapping using conversion characteristics created by tone map generation device 122, and causes display 130 to optimally display a video obtained as a result of the tone mapping.

Tone map generation device 122 optimizes the conversion characteristics used by HDR signal converter 121, according to the luminance of display 130. Tone map generation device 122 obtains from video receiver 110 the dynamic luminance characteristics included in the video data, and creates optimal conversion characteristics for use in tone map. Examples 1 to 5 will separately illustrate a specific method of creating conversion characteristics below.

Display 130 displays the video obtained as the result of the tone mapping.

[1-9. Operations]

Figure 12:
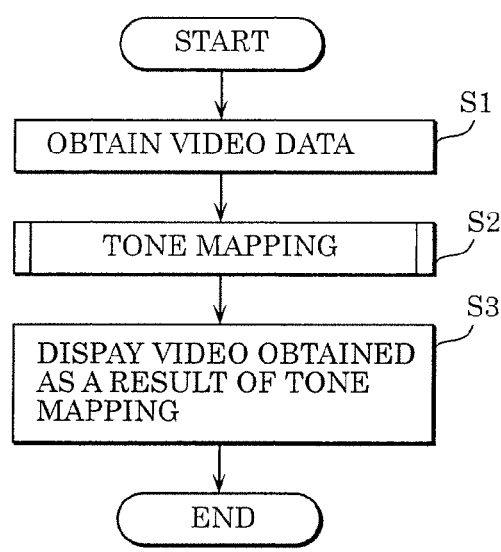
FIG. 12 is a flowchart showing the operations of the video display device according to the present embodiment.

FIG. 12 is a flowchart showing the operations of the video display device according to the present embodiment.

In video display device 100, first, video receiver 110 obtains video data including a main video, which is a video, and dynamic luminance characteristics indicating a time-dependent change in the luminance characteristics of the video (S1).

Next, tone mapping processor 120 performs tone mapping on the main video using conversion characteristics most suitable for the dynamic luminance characteristics and the maximum display luminance that is the maximum luminance of a display device, according to the dynamic luminance characteristics and the maximum display luminance (S2).

Finally, display 130 displays a video obtained as a result of the tone mapping (S3).

[1-10. Tone Mapping]

Next, the following describes examples of tone mapping.

[1-10-1. First Example of Tone Mapping]

The first example of tone mapping will be described below.

The first example illustrates a case in which a tone map is generated using DY100 and 99Y as dynamic metadata.

First, tone map generation device 122 identifies the luminance dynamic range of a main video using 99Y, and determines whether to perform (1) luminance compression or (2) no luminance compression on the identified luminance dynamic range. It should be noted that the luminance compression is a process of decreasing the luminance of a main video to reduce the luminance dynamic range of a video that display 130 is caused to display. For example, the luminance compression is a process of reducing a luminance dynamic range so that the maximum luminance of a main video becomes the maximum display luminance because, when the maximum luminance of the main video exceeds the maximum display luminance, display 130 cannot be caused to display the main video at the maximum luminance. Moreover, when tone map generation device 122 performs the luminance compression, tone map generation device 122 may further determine whether to perform (1-1) the luminance compression on the luminance dynamic range of the main video in a high luminance region or (1-2) the luminance compression on the entire luminance dynamic range of the main video.

Furthermore, when tone map generation device 122 performs (1-2) the luminance compression on the entire luminance dynamic range, tone map generation device 122 controls the luminance compression ratio of a dark part according to DY100 so as to maintain the tones and viewability of the dark part.

For example, tone map generation device 122 calculates, from 99Y of the dynamic metadata and a display luminance (DPB: Display Peak Brightness) indicating the maximum display luminance, a luminance compression ratio using Equation 2 below.

Luminance compression ratio=DPB/99Y  (Equation 2)

Tone map generation device 122 creates conversion characteristics that vary according to the calculated luminance compression ratio. For example, as described in the following (1) to (3), tone map generation device 122 creates conversion characteristics that vary according to a luminance compression ratio.

(1) Luminance Compression Ratio≥1

In this case, tone map generation device 122 needs no tone mapping, and thus does not create conversion characteristics. In other words, in this case, tone map generation device 122 determines to perform no luminance compression.

Accordingly, HDR signal converter 121 outputs the luminance of a video in a range up to 99Y without converting the luminance. For this reason, Scene Luminance equals to Display Luminance.

(2) Threshold Value TH_A<Luminance Compression Ratio<1

Threshold value TH_A is a value obtained by multiplying DPB by a predetermined coefficient (e.g., a number greater than 0.5 and less than 1). The predetermined coefficient is a value optimized based on experience. In this case, since a luminance compression ratio is close to 1 and luminance compression is small, conversion characteristics for the luminance compression in a high luminance region are created. In other words, in this case, tone map generation device 122 determines to perform the luminance compression in the high luminance region.

Specifically, as shown by "3" in FIG. 13, tone map generation device 122 creates conversion characteristics including (i) a PQ curve that outputs output luminance (i.e. display luminance) that is identical to input luminance (i.e. scene luminance) in a low luminance region below kneepoint, and (ii) a curve for luminance compression that adjusts 99Y to DPB in a high luminance region above kneepoint.

(3) Luminance Compression Ratio<Threshold Value TH_A

In this case, a luminance compression ratio is greater, and thus tone map generation device 122 creates conversion characteristics for luminance compression on an entire range to maintain the balance of an entire image. In other words, in this case, tone map generation device 122 determines to perform the luminance compression on the entire range.

The following focuses especially on a low luminance region below 100 nit in terms of performing the luminance compression on the entire range. A compression ratio often increases when luminance compression is performed in a low luminance region in PQ that indicates the absolute luminance. For this reason, there is a possibility that small values representing most of the low luminance region are outputted, and thus the details of the low luminance region are lost. In order to avoid the above, tone map generation device 122 creates conversion characteristics for performing an individual process on a signal below 100 nit using the parameter of DY100. DY100 indicates a screen occupancy ratio of pixels included in the low luminance region below 100 nit. Accordingly, when tone map generation device 122 performs the luminance compression on the entire range, tone map generation device 122 creates conversion characteristics for controlling a compression ratio for luminances less than or equal to 100 nit.

In other words, specifically, tone map generation device 122 creates conversion characteristics that vary depending on whether DY100 exceeds threshold value TH. It should be noted that threshold value TH is a threshold value optimized based on experience.

(3-1) DY100>Threshold Value TH

In this case, since a proportion of pixels having luminances less than or equal to 100 nit to total pixels is greater than threshold value TH, tone map generation device 122 determines that important details are present at the luminances less than or equal to 100 nit, and creates conversion characteristics for no luminance compression in a luminance region below 100 nit. In other words, in the case where a luminance region having a luminance less than or equal to a first luminance (e.g. KneePoint) is defined as a low luminance region and a luminance region above KneePoint is defined as a high luminance region, (i) when DY100 as first luminance characteristics exceeds threshold value TH, tone map generation device 122 creates first conversion characteristics that maintain luminances in a range below 100 nit as a second luminance, the first luminance characteristics being included in dynamic luminance characteristics and indicating the number of pixels having the luminances less than or equal to the second luminance among pixels included in the low luminance region in one frame of a video. Tone map generation device 122 creates, for example, conversion characteristics shown in (c) in FIG. 17 described later.

(3-2) DY100<Threshold Value TH

In this case, since a proportion of pixels having luminances less than or equal to 100 nit to total pixels is less than threshold value TH, tone map generation device 122 determines that the influence of luminance compression is small, and creates conversion characteristics for the luminance compression also in a low luminance region. In other words, when DY100 is less than or equal to threshold value TH, tone map generation device 122 creates second conversion characteristics decreasing luminances in a range below 100 nit. Tone map generation device 122 creates, for example, conversion characteristics shown in (b) in FIG. 17 described later.

It should be noted that the luminance compression ratio in this case may be changed according to the value of DY100, and the maximum compression ratio (e.g. 0.8) may be specified and protected. In other words, tone map generation device 122 may create, as the second conversion characteristics, a conversion curve having a slope that is less than 1 in the range below 100 nit. Moreover, tone map generation device 122 may create, as the second conversion characteristics, a conversion curve that causes a proportion of the luminances in the range below 100 nit to decrease with a decrease in the value indicated by DY100.

Figure 14:
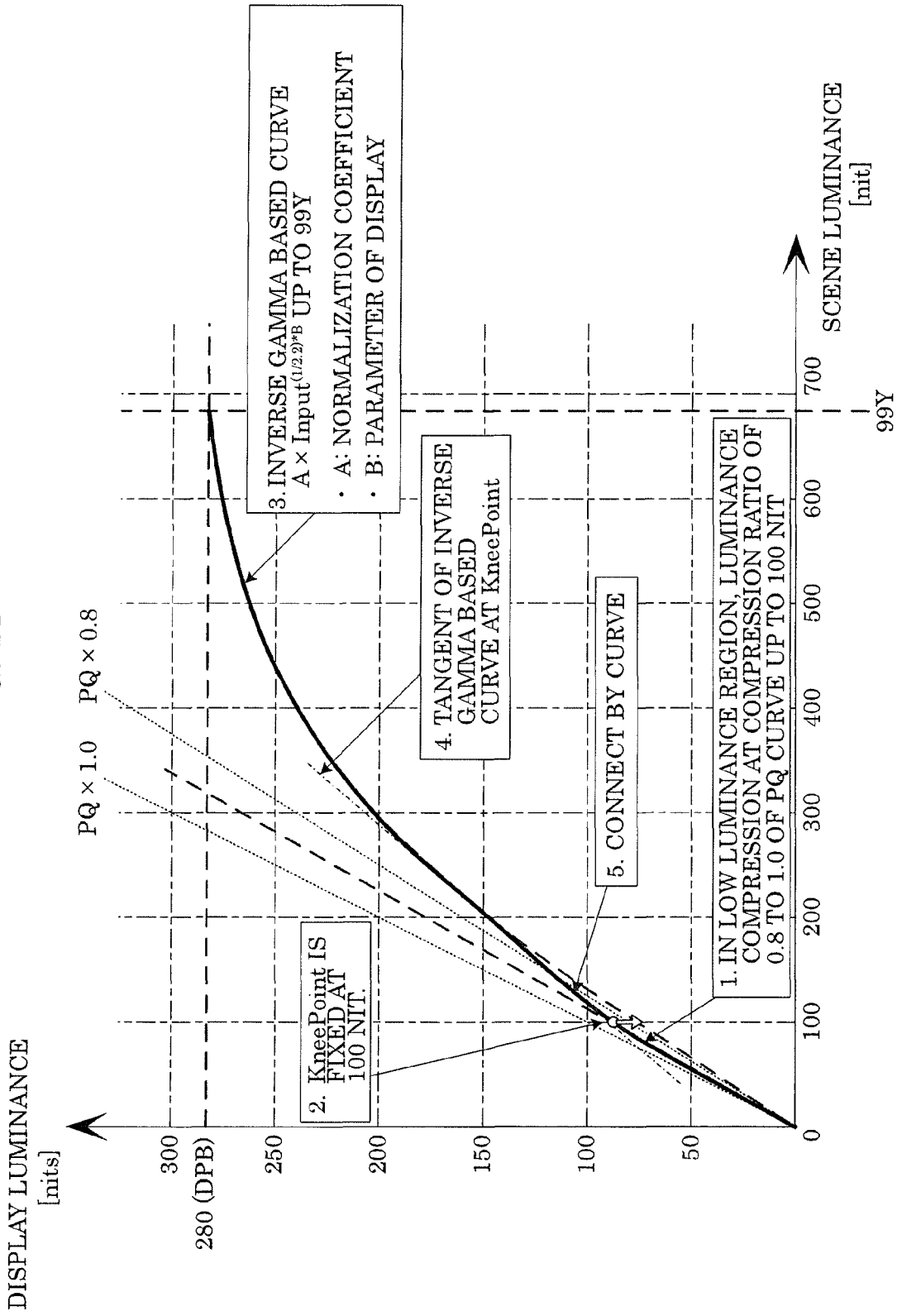
FIG. 14 is a graph for illustrating a method of creating conversion characteristics created when DY100<threshold value TH.

FIG. 14 is a graph for illustrating a method of creating conversion characteristics created when DY100<threshold value TH. FIG. 14 is a graph showing a relationship of display luminance (output luminance) to scene luminance (input luminance), that is, an example of the second conversion characteristics.

As shown in FIG. 14, in a low luminance region, the second conversion characteristics are a curve for luminance compression at a compression ratio from 0.8 to 1.0 of a PQ curve in a range up to 100 nit. It should be noted that when DY100<threshold value TH, the compression ratio is less than 1.0. KneePoint is 100 nit. Moreover, in a high luminance region, the second conversion characteristics are an inverse gamma based curve A×Input$^{(1/2.2)*B}$ up to 99Y. Finally, the second conversion characteristics are a curve obtained by connecting the curve in the low luminance region and the curve in the high luminance region so that the curve has a continuous, more smooth slope.

Next, the following describes the first example of tone mapping with reference to a flowchart.

Figure 15:
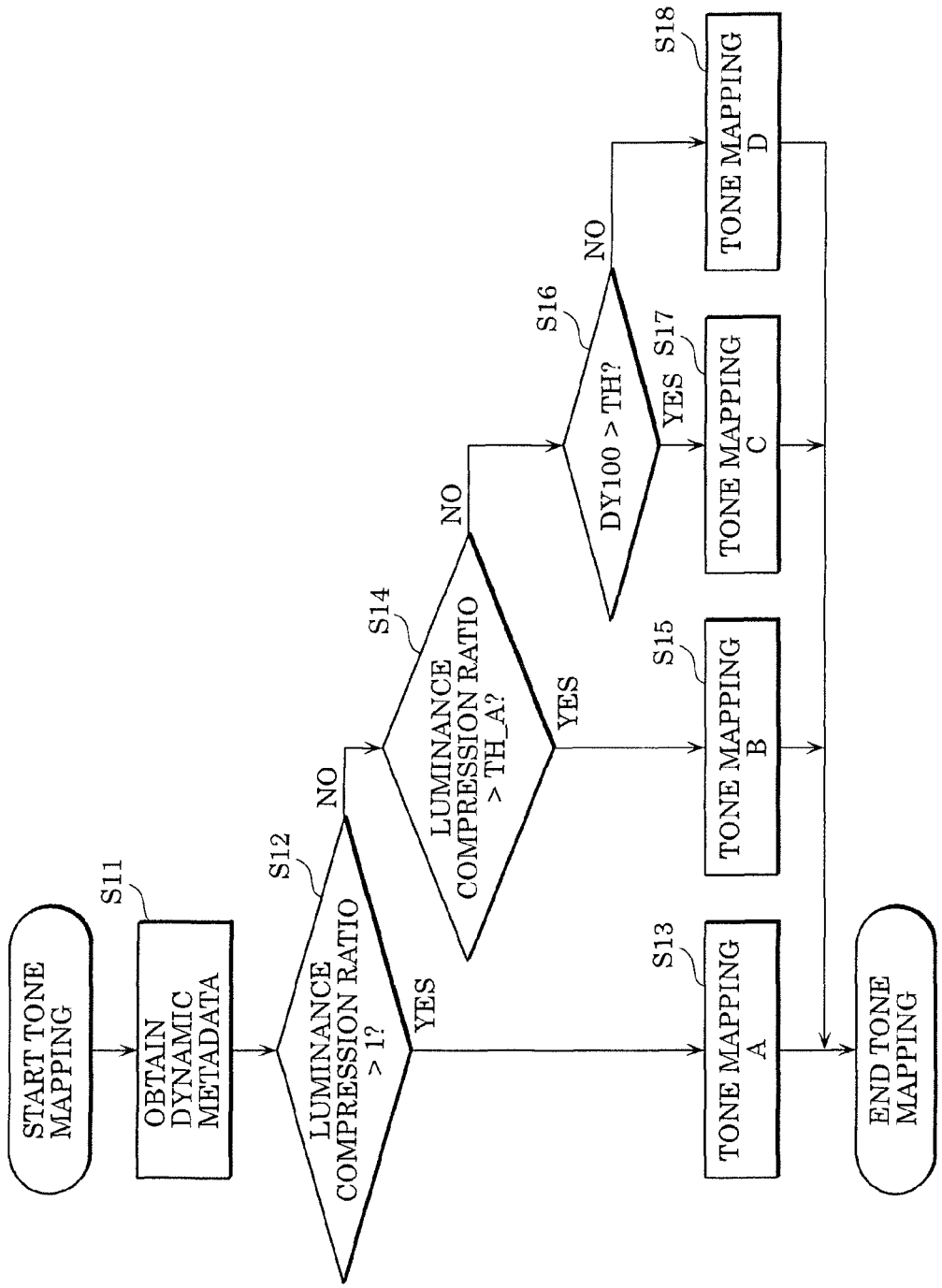
FIG. 15 is a flowchart for illustrating the first example of tone mapping.

FIG. 15 is a flowchart for illustrating the first example of tone mapping.

Tone mapping processor 120 performs tone mapping.

In the first example, when the tone mapping is started in step S2 in the above-described flowchart of FIG. 12, tone map generation device 122 obtains dynamic metadata included in video data (S11).

Next, tone map generation device 122 calculates a luminance compression ratio using 99Y included in the dynamic metadata and DPB of video display device 100, and determines whether the calculated luminance compression ratio exceeds 1 (S12).

When tone map generation device 122 determines that the luminance compression ratio exceeds 1 (Yes in S12), tone map generation device 122 determines that luminance compression is not to be performed, and outputs conversion characteristics for no luminance compression to HDR signal converter 121. Subsequently, HDR signal converter 121 performs tone mapping A using the conversion characteristics for no luminance compression, and outputs a video signal obtained as a result of tone mapping A to display 130 (S13).

When tone map generation device 122 determines that the luminance compression ratio is less than or equal to 1 (No in S12), tone map generation device 122 determines whether the luminance compression ratio exceeds threshold value TH_A (S14).

Figure 13:
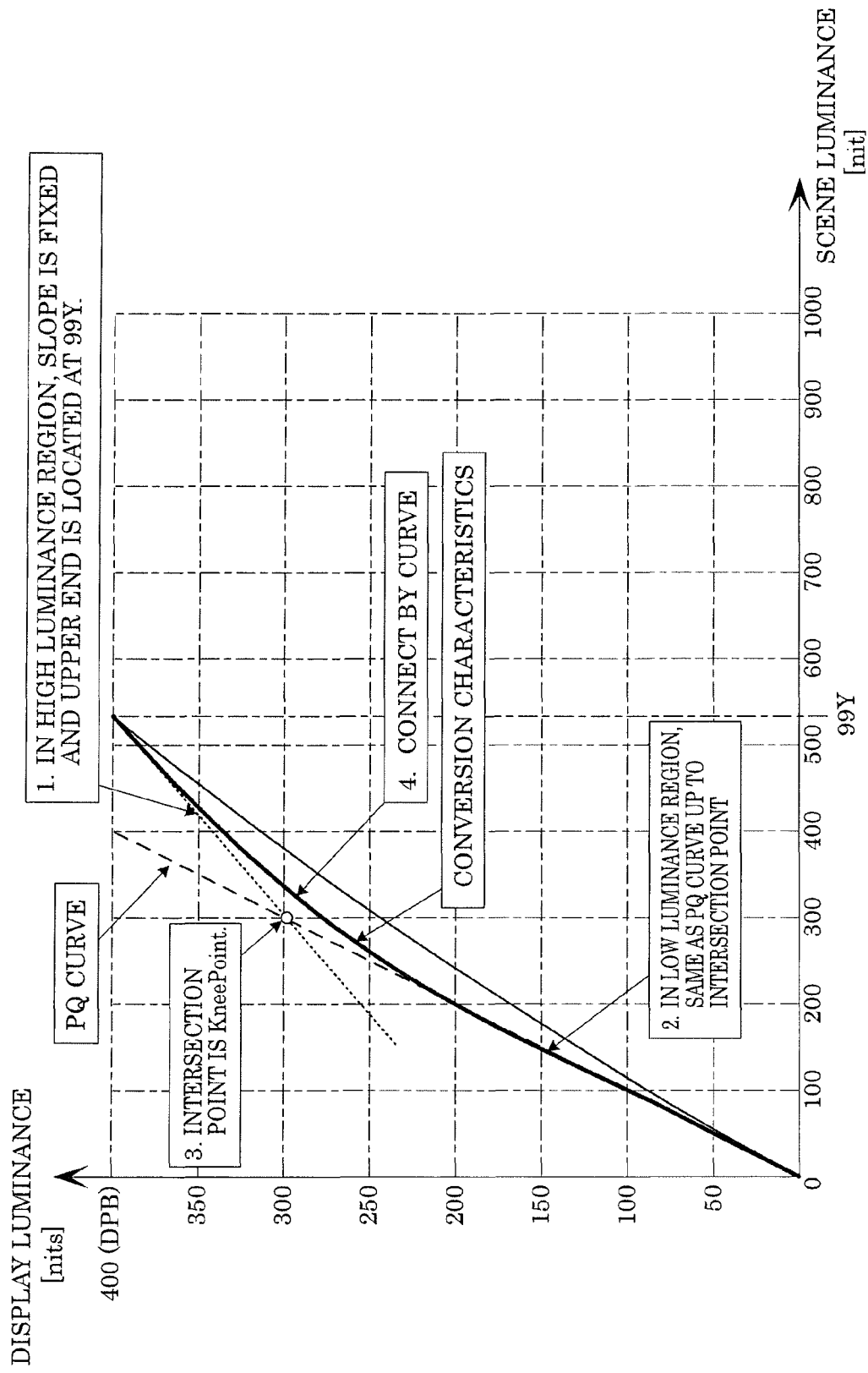
FIG. 13 is a graph for illustrating a method of creating conversion characteristics created when threshold value TH_A<luminance compression ratio<1.

When tone map generation device 122 determines that the luminance compression ratio exceeds threshold value TH_A (Yes in S14), tone map generation device 122 determines that the luminance compression is to be performed in a high luminance region, and outputs the conversion characteristics shown in FIG. 13 to HDR signal converter 121. Subsequently, HDR signal converter 121 performs tone mapping B using the conversion characteristics shown in FIG. 13, and outputs a video signal obtained as a result of tone mapping B to display 130 (S15).

When tone map generation device 122 determines that the luminance compression ratio is less than or equal to threshold value TH_A (No in S14), tone map generation device 122 determines whether DY100 included in the obtained dynamic metadata exceeds threshold value TH (S16).

When tone map generation device 122 determines that DY100 exceeds threshold value TH (Yes in S16), tone map generation device 122 outputs conversion characteristics for no luminance compression in a luminance region below 100 nit to HDR signal converter 121. Subsequently, HDR signal converter 121 performs tone mapping C using the outputted conversion characteristics, and outputs a video signal obtained as a result of tone mapping C to display 130 (S17).

When tone map generation device 122 determines that DY100 is less than or equal to threshold value TH (No in S16), tone map generation device 122 outputs the conversion characteristics that are shown in FIG. 14 and decrease luminances in a range below 100 nit, to HDR signal converter 121. Subsequently, HDR signal converter 121 performs tone mapping D using the outputted conversion characteristics, and outputs a video signal obtained as a result of tone mapping D to display 130 (S18).

[1-10-2. Second Example of Tone Mapping]

The second example of tone mapping will be described below. In the second example, a method of creating conversion characteristics will be described that is different from the first example in which DY100 and 99Y are used.

In this example, tone map generation device 122 calculates the maximum value of an input signal according to 99Y, and determines a slope at a 100 nit point according to DY100.

Figure 16:
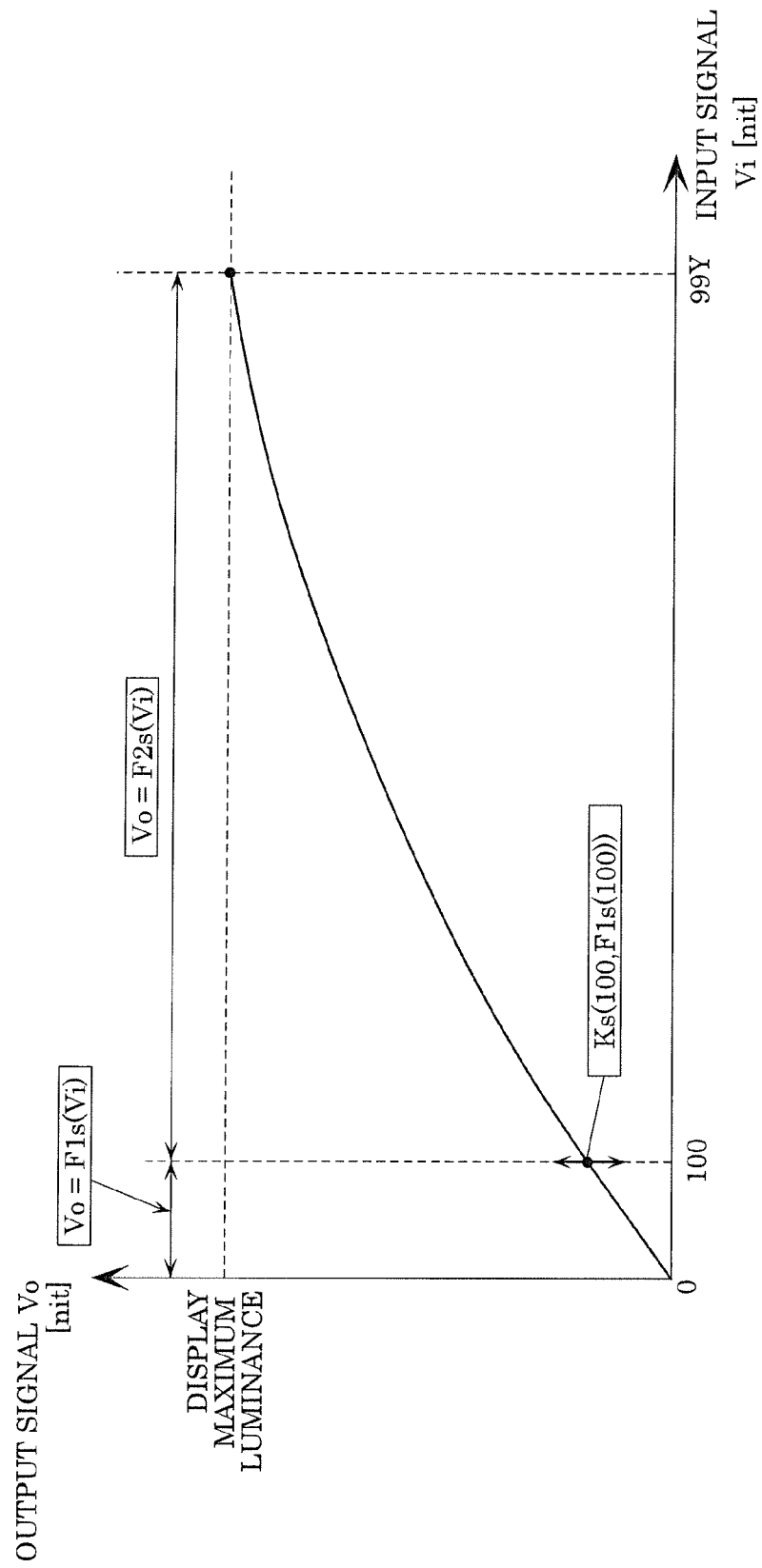
FIG. 16 is a graph for illustrating a method of creating conversion characteristics in the second example.

FIG. 16 is a graph for illustrating the method of creating conversion characteristics in the second example.

In the second example, tone map generation device 122 creates conversion characteristics including the origin coordinates, the 100 nit coordinates (Ks), and the maximum value coordinates (99Y, DPB: Display Peak Brightness) shown in FIG. 16. Tone map generation device 122 calculates an output luminance (F1s(100)) corresponding to an input luminance at 100 nit using DY100, and determines the slope of conversion characteristics below 100 nit and the slope of conversion characteristics at the 100 nit coordinates Ks to be, for example, 1.0.

Next, tone map generation device 122 determines the slope of conversion characteristics at 99Y using 99Y, and connects the three points of the origin coordinates, the 100 nit coordinates Ks, and the maximum value coordinates with a spline curve to generate a tone map.

Figure 17:
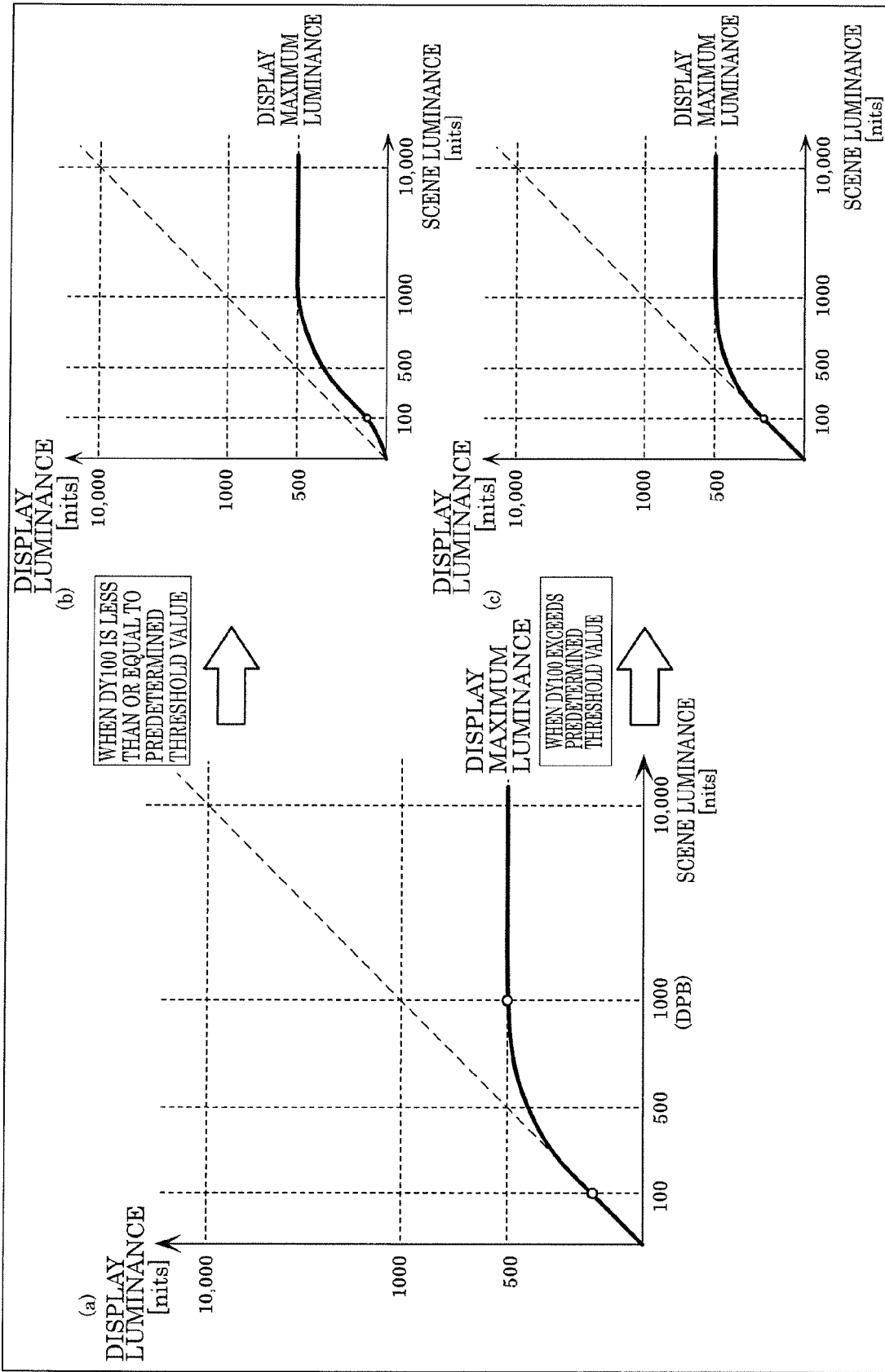
FIG. 17 is a diagram for illustrating a method of creating conversion characteristics in the second example.

Specifically, as shown in (b) in FIG. 17, when DY100 is less than or equal to a predetermined threshold value, tone map generation device 122 may create conversion characteristics of which the slope up to 100 nit coordinates is decreased by reducing the value of F1s(100). Moreover, in this case, tone map generation device 122 creates conversion characteristics of which the slope in a range above 100 nit is made greater than the slope in a range below 100 nit by decreasing a slope at 100 nit coordinates Ks. As a result, it is possible to ensure the tones of the range above 100 nit.

Furthermore, at the same time, tone map generation device 122 may create conversion characteristics of which the slope is weighted using percentile information. For example, when maxRGB Percentile [75] becomes a value (e.g. a value within a predetermined luminance range having 99Y as a reference) close to 99Y, tone map generation device 122 can determine that there are many gray scale components in a high luminance region (in the vicinity of 99Y). For this reason, tone map generation device 122 may create conversion characteristics of which the slope increases from maxRGB Percentile [75] to 99Y. As a result, it is possible to improve the tones between maxRGB Percentile [75] and 99Y.

It should be noted that in FIG. 16 Ks (100, F1(100)) indicates the knee-point of a scene determined by estimating DY100. Further, F1s(Vi) indicates a linear function for a low-level signal (a low luminance region) of a scene, such as a luminance range from 0 to 100 nit of a video input signal. F2s(Vi) indicates a spline curve function for a medium-level signal and a high-level signal (medium and high luminance regions) of a scene, such as a luminance range from 100 nit to 99Y of a video input signal.

[1-10-3. Third Example of Tone Mapping]

The third example of tone mapping will be described below. In the third example, tone mapping in a high luminance region will be described.

Figure 18:
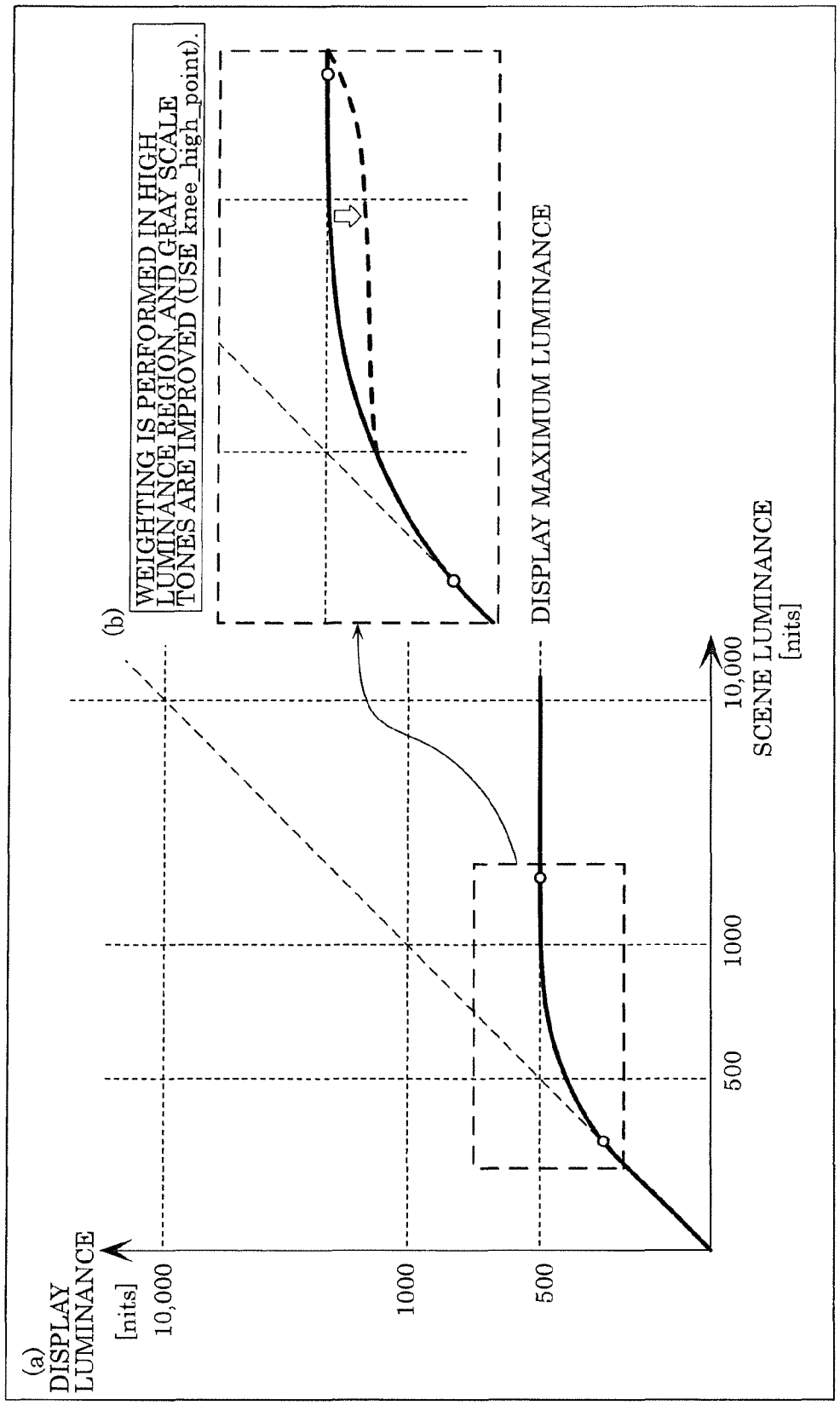
FIG. 18 is a diagram for illustrating conversion characteristics created in the third example of tone mapping.

FIG. 18 is a diagram for illustrating conversion characteristics created in the third example of tone mapping.

In this case, tone map generation device 122 creates conversion characteristics that represent a luminance range from 18G to 99Y with a range of luminances from 18G to the maximum luminance (Max_Luminance) of video display device 100, using 18G and 99Y of dynamic metadata. For this reason, as shown in (b) in FIG. 18, tone map generation device 122 creates conversion characteristics for which the weights of tones in the high luminance region are increased, using a value of at least one of maxRGB Percentile [90] and maxRGB Percentile [98]. In other words, tone map generation device 122 creates conversion characteristics of which the slope in the high luminance region is increased.

Figure 19:
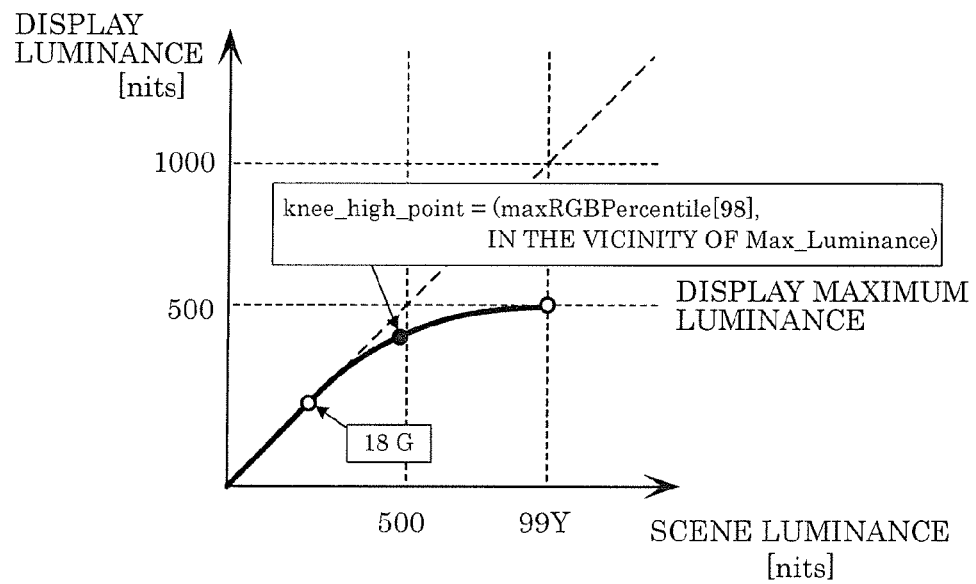
FIG. 19 is a graph showing an example of conversion characteristics created when both maxRGB Percentile [90] and maxRGB Percentile [98] are closer to 18G than to 99Y.
Figure 20:
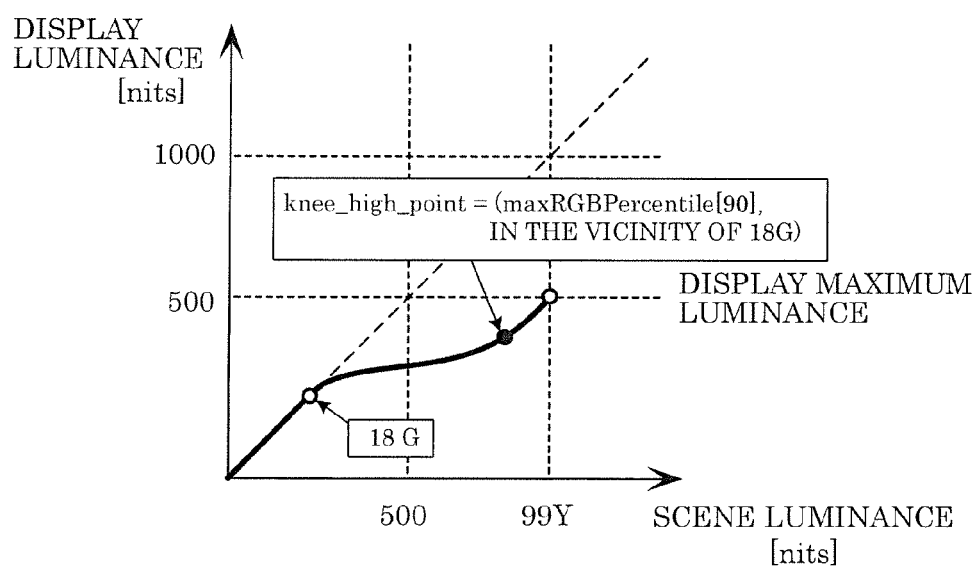
FIG. 20 is a graph showing an example of conversion characteristics created when both maxRGB Percentile [90] and maxRGB Percentile [98] are closer to 99Y than to 18G.

FIG. 19 is a graph showing an example of conversion characteristics created when both maxRGB Percentile [90] and maxRGB Percentile [98] are closer to 18G than to 99Y. FIG. 20 is a graph showing an example of conversion characteristics created when both maxRGB Percentile [90] and maxRGB Percentile [98] are closer to 99Y than to 18G.

For example, when both maxRGB Percentile [90] and maxRGB Percentile [98] are closer to 18G than to 99Y, tone map generation device 122 sets knee_high_point, the upper limit of a region for setting KneePoint, to maxRGB Percentile [98]. In consequence, as shown in FIG. 19, tone map generation device 122 creates conversion characteristics for which the weights of tones from 18G to maxRGB Percentile [98] are increased, that is, of which the slope is close to 1 (e.g. the slope is greater than 0.8).

In contrast, when both maxRGB Percentile [90] and maxRGB Percentile [98] are closer to 99Y than to 18G, tone map generation device 122 sets knee_high_point to be in the vicinity of Max_Luminance. In consequence, as shown in FIG. 20, tone map generation device 122 creates conversion characteristics for which the weights of tones from knee_high_point to 99Y are increased, that is, of which the slope is close to 1 (e.g. the slope is greater than 0.8).

It should be noted that it is possible to generate a tone map weighted with these values, other than the examples of FIG. 19 and FIG. 20. Tone map generation device 122 may create conversion characteristics using dynamic metadata, such as knee_point_x, knee_point_y, and bezier_anchor.

It should be noted that the third example of tone mapping may be performed for (2) Threshold Value TH_A<Luminance Compression Ratio<1 or (3-1) DY100>Threshold Value TH in (3) Luminance Compression Ratio<Threshold Value TH_A of the first example.

As described above, in tone mapping B or tone mapping C shown in FIG. 15, (i) when the third luminance is closer to 18G as the second luminance than to the maximum luminance (i.e. 99Y) in one frame, tone map generation device 122 creates conversion characteristics of which the slope from the second luminance to the third luminance is greater than a slope in a range exceeding the third luminance, the third luminance being a luminance when a cumulative value from 0 reaches at least one of 90% or 98% as the first proportion that is at least 90% of total pixels in a histogram of maxRGB of each pixel in the one frame (i.e. at least one of maxRGB Percentile [90] and maxRGB Percentile [98]).

Moreover, in tone mapping B or tone mapping C shown in FIG. 15, (ii) when the third luminance is closer to the maximum luminance than to the second luminance, tone map generation device 122 creates conversion characteristics of which the slope from the second luminance to the third luminance is less than a slope in a range exceeding the third luminance.

As a result, when at least one of maxRGB Percentile [90] and maxRGB Percentile [98] is a value closer to 18G than to 99Y, it can be said that at least 90% of the total pixels is concentrated on the luminances close to 18G. For this reason, it is possible to increase the weights of tones from 18G to maxRGB Percentile [98] by performing tone mapping using conversion characteristics of which the slope from 18G to maxRGB Percentile [98] is made greater than a slope exceeding maxRGB Percentile [98]. Accordingly, it is possible to improve the tones of the pixels having the luminances concentrated in one frame, thereby enhancing the video quality.

Moreover, when at least one of maxRGB Percentile [90] and maxRGB Percentile [98] is a value closer to 99Y than to 18G, it can be said that the remaining 10% or 2% of the total pixels is concentrated in the high luminance region up to 99Y. For this reason, it is possible to increase the weights of tones from maxRGB Percentile [90] to 99Y by performing tone mapping using conversion characteristics of which the slope from maxRGB Percentile [90] to 99Y is made greater than a slope from 18G to maxRGB Percentile [90]. Accordingly, it is possible to improve the tones of the pixels having the luminances concentrated in one frame, thereby enhancing the video quality.

It should be note that although 18G is illustrated as the second luminance in the third example, the second luminance may be 100 nit.

[1-10-4. Fourth Example of Tone Mapping]

The fourth example of tone mapping will be described below. In the fourth example, tone mapping in a low luminance region will be described.

The luminance compression is performed in the low luminance region when DY100 is less than or equal to threshold value TH_A in the first example, but the present disclosure is not limited to this. For example, it may determine whether to perform the luminance compression in the low luminance region according to a value of maxRGB Percentile [1].

Specifically, tone map generation device 122 determines whether a luminance distribution in the low luminance region (dark part) is broad or narrow depending on whether maxRGB Percentile [1] of dynamic metadata has a luminance higher than predetermined luminance. Then, when tone map generation device 122 determines that the luminance distribution in the dark part is narrow, tone map generation device 122 may create conversion characteristics for compressing a luminance dynamic range by performing tone mapping on a dark part side, and expanding an entire dynamic range as shown in, for example, (b) in above-described FIG. 17. For example, when maxRGB Percentile [1] has 200 nit, the area of pixels having luminances less than or equal to 200 nit accounts for at most 1% of the area of an entire screen. For this reason, an overall influence is small even when luminance information about the luminances less than or equal to 200 nit is compressed. Further, at the same time, it is possible to output a video signal in which the tones of an input signal greater than or equal to 200 nit are maintained, by causing a slope in a region above 200 nit to be 1.

[1-10-5. Fifth Example of Tone Mapping]

The fifth example of tone mapping will be described below. In the fifth example, a method of determining Knee-Point (knee-point) will be described.

Tone map generation device 122 determines KneePoint (a point at which compression of content luminance is started) of conversion characteristics using 99Y and 18G. As a result, it is possible to appropriately improve the contrast of a specific luminance region.

When, for example, 99Y is higher than DPB of video display device 100, tone map generation device 122 uses 18G to determine KneePoint for conversion characteristics, 99Y serving as a convergent point. Tone map generation device 122 sets the following values for 99Y.

Tone map generation device 122 sets, as kneepoint_max, the upper value at which conversion characteristics allow for visual identification of all the tones. Moreover, tone map generation device 122 sets, as kneepoint_min, a value at which conversion characteristics allow for uniform, visual identification of all the tones. Here, kneepoint_max is the upper value of a luminance range for determining Knee-Point, and kneepoint_min is the lower value of the luminance range for determining KneePoint.

Furthermore, since at least 80% of a luminance distribution is concentrated at a value less than or equal to the value indicated by 18G, tone map generation device 122 determines kneepoint using 18G.

Figure 21:
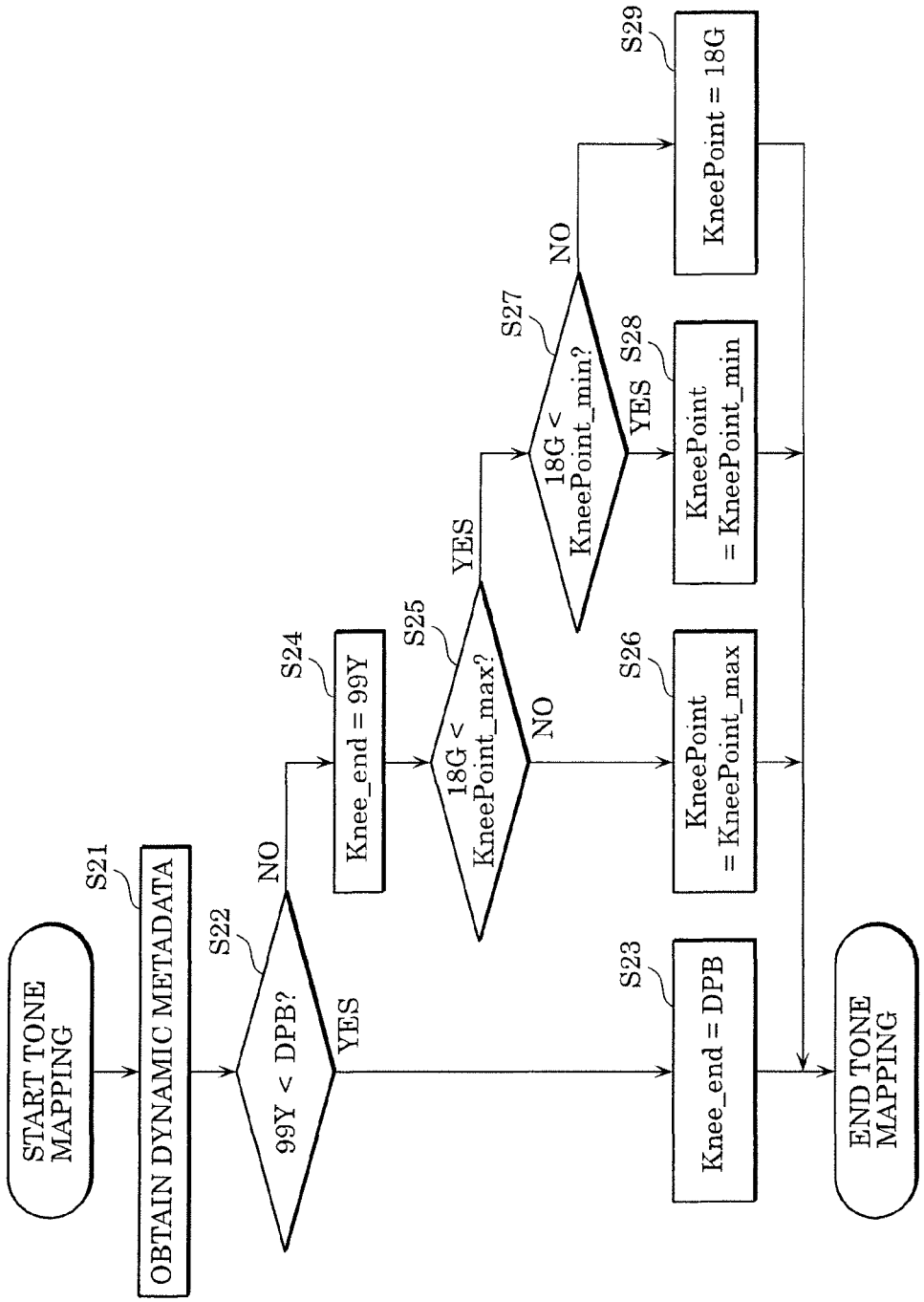
FIG. 21 is a flowchart for illustrating the fifth example of tone mapping.
Figure 22:
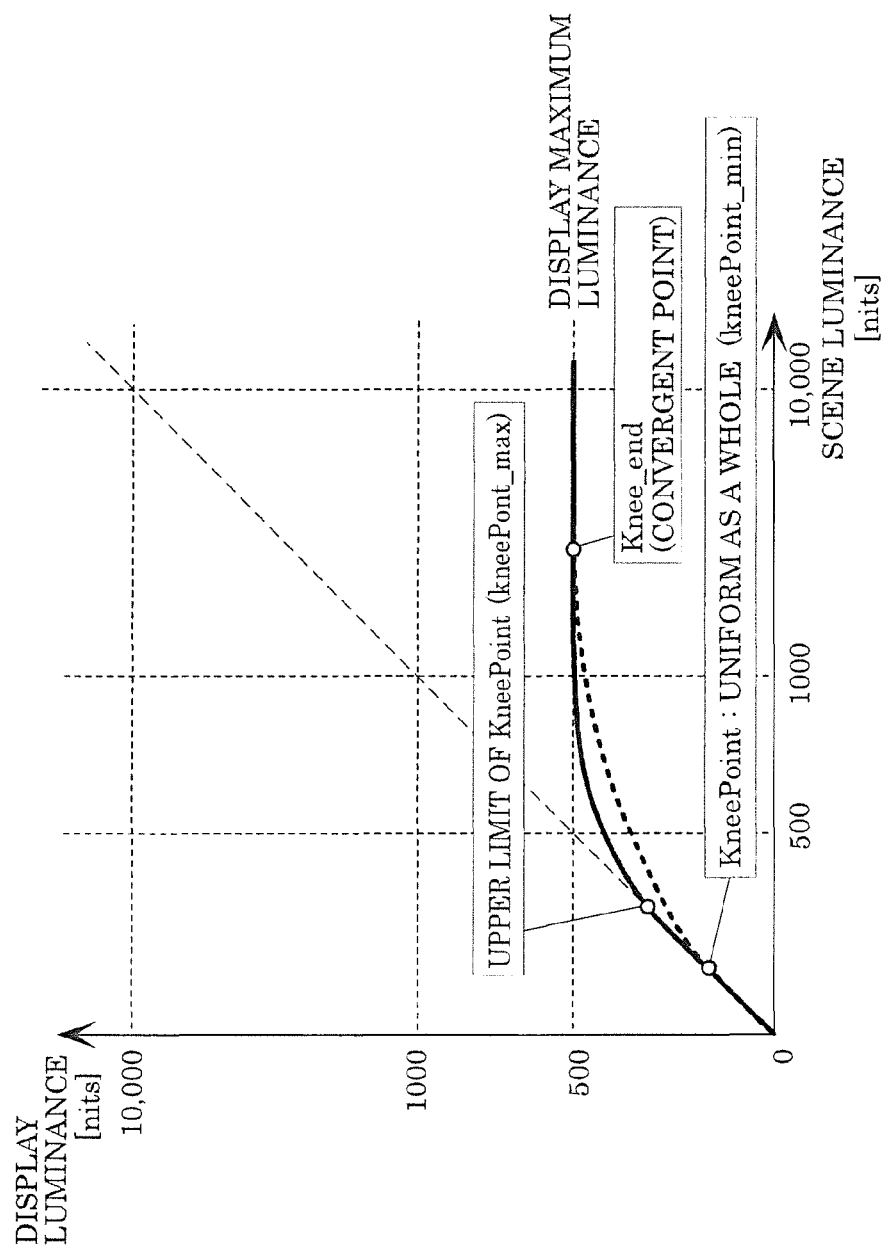
FIG. 22 is a graph for illustrating conversion characteristics created in the fifth example of tone mapping.

FIG. 21 is a flowchart for illustrating the fifth example of tone mapping. FIG. 22 is a diagram for illustrating conversion characteristics created in the fifth example of tone mapping.

In the fifth example, when the tone mapping is started in step S2 in the above-described flowchart of FIG. 12, tone map generation device 122 obtains dynamic metadata included in video data (S21).

Next, tone map generation device 122 determines whether 99Y included in the dynamic metadata is less than or equal to DPB of video display device 100 (S22).

When tone map generation device 122 determines that 99Y is less than or equal to DPB (Yes in S22), tone map generation device 122 sets Knee_end, the convergent point of conversion characteristics on a high luminance side, to DPB (S23).

When tone map generation device 122 determines that 99Y exceeds DPB (No in S22), tone map generation device 122 sets Knee_end to 99Y (S24).

Subsequently, tone map generation device 122 determines whether 18G is less than KneePoint_max (S25).

When tone map generation device 122 determines that 18G is greater than or equal to KneePoint_max (No in S25), tone map generation device 122 sets KneePoint to Knee-Point_max (S26).

When tone map generation device 122 determines that 18G is less than KneePoint_max (Yes in S25), tone map generation device 122 determines whether 18G is less than KneePoint_min (S27).

When tone map generation device 122 determines that 18G is less than KneePoint_min (Yes in S27), tone map generation device 122 sets KneePoint to KneePoint_min (S28).

When tone map generation device 122 determines that 18G is greater than or equal to KneePoint (No in S27), tone map generation device 122 sets KneePoint to 18G.

When steps S23, S26, S28, and S29 end, tone map generation device 122 terminates the process.

Tone map generation device 122 may create the conversion characteristics in the above first to fourth examples using KneePoint set in the process.

[2. Method of Generating Dynamic Metadata]

Next, the following describes a method of generating dynamic metadata.

Hereinafter, a method of generating metadata is disclosed that is required to solve the conventional problem with a dynamic tone map.

[2-1. Configuration of Generation Device]

The following describes the configuration of a generation device that generates dynamic metadata.

Figure 23:
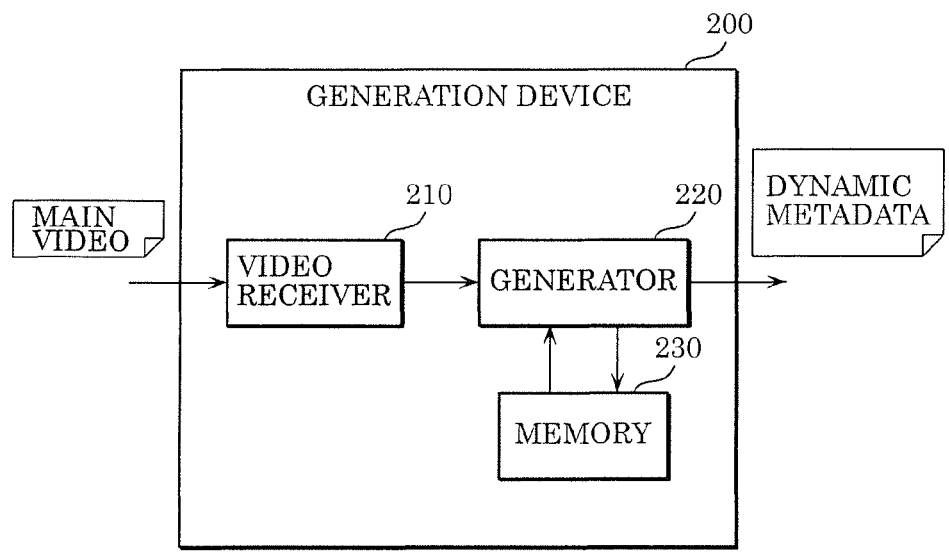
FIG. 23 is a block diagram illustrating an example of the configuration of a generation device according to the embodiment.
Figure 24:
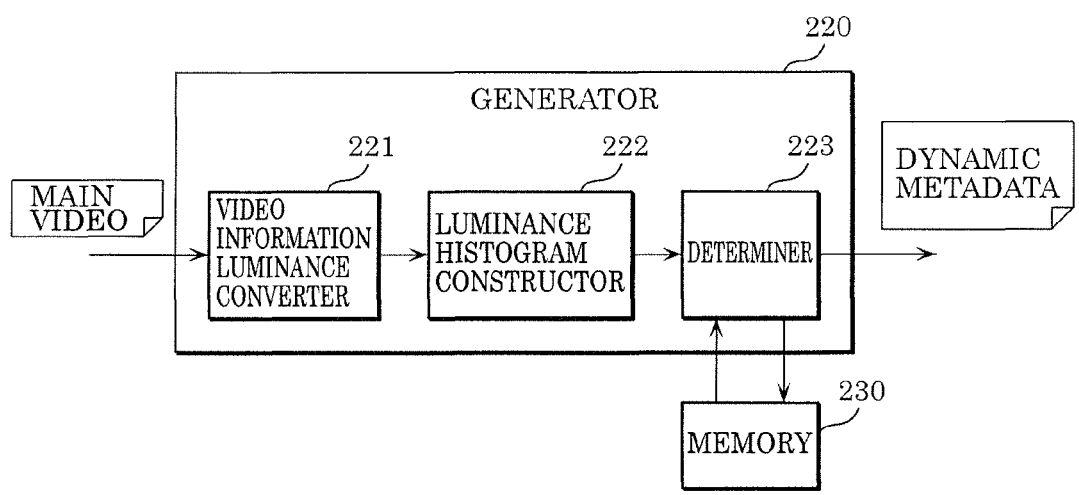
FIG. 24 is a block diagram illustrating an example of the configuration of a generator according to the embodiment.

FIG. 23 is a block diagram illustrating an example of the configuration of the generation device according to the embodiment. FIG. 24 is a block diagram illustrating an example of the configuration of a generator according to the embodiment.

Generation device 200 includes video receiver 210, generator 220, and memory 230.

Video receiver 210 receives a main video that is a video. In other words, video receiver 210 serves as an obtainer that obtains the main video. Video receiver 210 outputs the received main video to generator 220.

Generator 220 analyzes the main video outputted by video receiver 210 to generate dynamic metadata indicating luminance characteristics for each scene. Specifically, generator 220 generates dynamic metadata for each frame, and temporarily stores into memory 230 the dynamic metadata generated from the frames included in one scene. Subsequently, generator 220 generates the dynamic metadata for each scene by calculating an average value or the maximum value using the dynamic metadata for as much as one scene. It should be noted that generator 220 may output metadata generated for each frame.

Generator 220 includes video information luminance converter 221, luminance histogram constructor 222, and determiner 223.

Video information luminance converter 221 converts a video signal having an RGB value, into a luminance signal.

Luminance histogram constructor 222 constructs a luminance histogram from signal information obtained by video information luminance converter 221 performing luminance conversion.

Determiner 223 determines dynamic metadata for each frame using the luminance histogram constructed by luminance histogram constructor 222. Moreover, determiner 223 merges temporally similar video information using the dynamic data generated from the frames included in one scene temporarily stored in memory 230. Here, the term "merge" means calculating the maximum value in a scene (similar frame) at 99Y and an average value in a scene (similar frame) at 100DY.

Memory 230 temporarily stores the dynamic metadata for each frame generated by generator 220.

[2-2. Operations of Generation Device]

Next, the following describes a method of generating dynamic metadata by a generation device.

Figure 25:
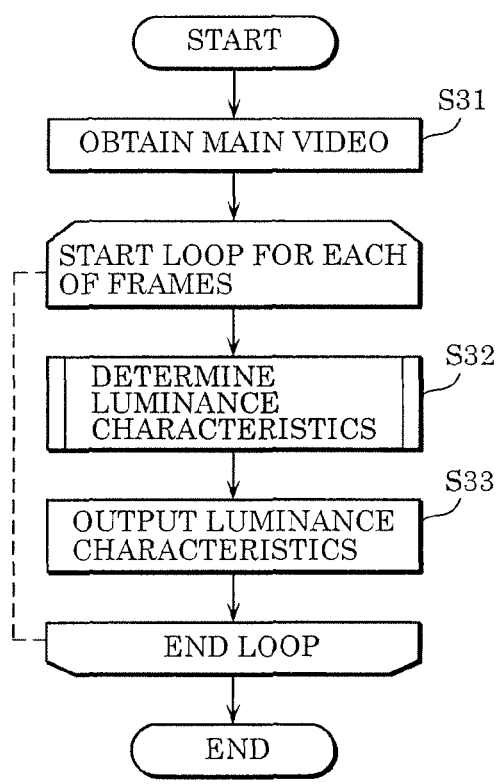
FIG. 25 is a flowchart showing an example of a generation method.

FIG. 25 is a flowchart showing an example of a generation method.

First, in generation device 200, video receiver 210 obtains a main video (S31).

Next, generator 220 starts a loop for repeating step S32 and step S33 for each of frames constituting the main video obtained by video receiver 210.

Generator 220 determines luminance characteristics for a frame to be processed (S32). The details of the step of determining luminance characteristics will be described with reference to FIG. 26.

Figure 26:
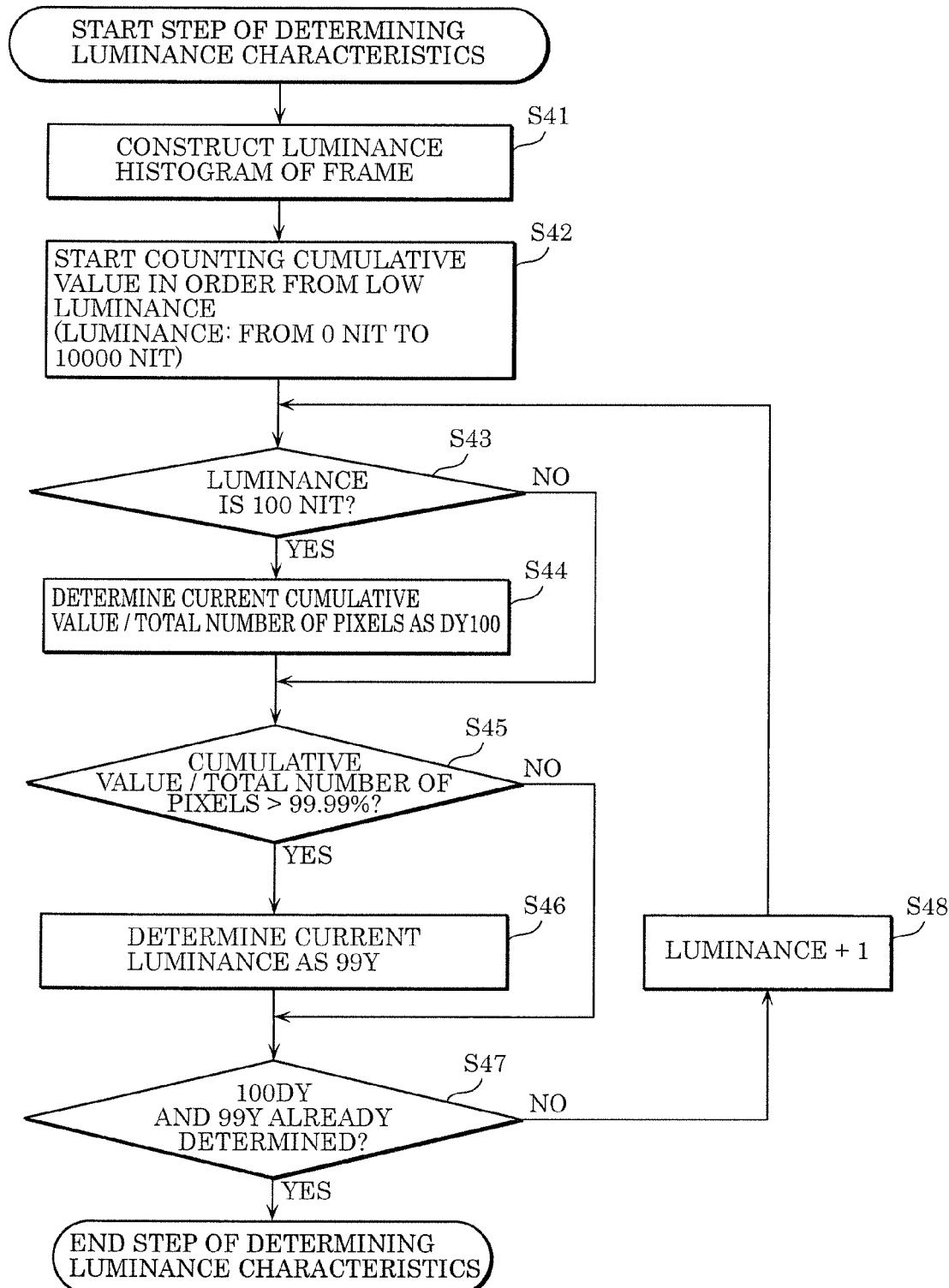
FIG. 26 is a flowchart showing a step of determining luminance characteristics in the generation method.

FIG. 26 is a flowchart showing the step of determining luminance characteristics in the generation method.

Generator 220 analyzes the luminances of all pixels included in the frame to be processed, and constructs a luminance histogram (S41).

Next, generator 220 starts counting an integrated value in order from low luminance in the luminance histogram (S42). Specifically, generator 220 counts a pixel having a set luminance while sequentially increasing luminance from 0 nit by 1 nit in the luminance histogram.

Next, generator 220 determines whether a luminance value to be counted is 100 nit (S43).

When generator 220 determines that the luminance to be counted is 100 nit (Yes in S43), generator 220 determines, as DY100, a value obtained by dividing the integrated value counted thus far by the total number of pixels (S44). In other words, generator 220 determines, as DY100 that is first luminance characteristics, a value obtained by dividing, for each of the frames constituting the video, the number of pixels having at most 100 nit as a predetermined luminance among pixels included in the frame by the total number of the pixels included in the frame.

After step S44 or when generator 220 determines that the luminance to be counted is not 100 nit (No in S43), generator 220 determines whether the value obtained by dividing the current integrated value by the total number of the pixels exceeds 99.99% (S45).

When generator 220 determines that the value obtained by dividing the current integrated value by the total number of the pixels exceeds 99.99% (Yes in S45), generator 220 determines the luminance to be counted as 99Y (S46). In other words, here, generator 220 identifies, for each of the frames constituting the video, the maximum luminance that is the luminance at 99.99% of all the pixels when all the pixels included in the frame are arranged in order of increasing luminance, and determines the identified maximum luminance as 99Y that is second luminance characteristics.

After step S46 or when generator 220 determines that the value obtained by dividing the current integrated value by the total number of the pixels is less than or equal to 99.99% (No in S45), generator 220 determines whether 100DY and 99Y are already determined (S47).

When generator 220 determines that 100DY and 99Y are already determined (Yes in S47), generator 220 ends the step of determining luminance characteristics.

When generator 220 determines that 100DY and 99Y are not already determined (No in S47), generator 220 increases the luminance to be counted by 1 nit and returns to step S43.

Returning to FIG. 25, when generator 220 ends the step of determining luminance characteristics, generator 220 outputs the determined luminance characteristics to memory 230 (S33). Next, when luminance characteristics for as much as one scene are accumulated in memory 230, generator 220 performs merging using the luminance characteristics for as much as one scene, outputs dynamic metadata resulting from the merging, and ends the process.

It should be noted generation device 200 records the outputted dynamic metadata in the supplemental enhancement information (SEI) of content. In other words, generation device 200 may record the dynamic metadata together with the video onto a recording medium, such as HDD, SSD, and BD.

It should be noted that although the example has been described in which DY100 and 99Y included in dynamic metadata are generated as the dynamic metadata generated by generation device 200, other dynamic metadata may be generated in the same manner.

As described above, generation device 200 can analyze the video to generate the dynamic metadata. Accordingly, because the video display device obtains, in addition to the video, the dynamic metadata indicating the dynamic luminance characteristics of the video, the video display device can perform tone mapping according to the luminance characteristics of the video indicated by the dynamic metadata. In other words, the video display device can perform dynamic tone mapping without analyzing a video, and reduce processing load.

Further, because the video display device can reduce a processing time for analyzing a video, the video display device can effectively perform dynamic tone mapping on the video.

[3. Variations]

A main video is, for example, an HDR video. The HDR video may be a video on, for example, a Blu-ray disc, a DVD, a video distribution site on the Internet, a broadcast, or an HDD (Hard Disk Drive).

The video reproduction device may be a device that decodes compressed video signals from a recording medium, a broadcast, or the Internet, and transmits the decoded video signals to the video display device. Examples of the device include a disc player, a disc recorder, a set top box, a television set, a personal computer, and a smartphone. Part or all of the functions of the video reproduction device may be included in video display device 100.

A video signal transmitting means that transmits video signals from the video reproduction device to the video display device may be a means that transmits video signals in uncompressed form, such as HDMI (registered trademark), DVI, or DP, and maybe a means that transmits video signals in compressed form, such as transmission via a network.

The maximum luminance information or tone mapping information of the video display device may be set in the video reproduction device by a user providing input to the video reproduction device using a remote control or an operating portion of the video reproduction device. Alternatively, the user may obtain such information using the Internet or another means, store the obtained information in a portable storage medium, and transmit the information to the video reproduction device via the portable storage medium. Moreover, the video reproduction device may be directly connected to the Internet, and the video reproduction device may obtain such information from the database of a server. Furthermore, the video reproduction device may display a test pattern on the video display device, and obtain and store the information while checking the characteristics of the video display device using the displayed test pattern.

Although the video display method and luminance characteristics generation method according to the embodiment of the present disclosure have been described above, the present disclosure is not limited to the embodiment.

Moreover, each of processing units included in the video display device and the generation device according to the embodiment is typically implemented as LSI (large scale integration) that is an integrated circuit. These may be implemented in a single chip individually, or in a single chip that includes some or all of them.

Moreover, the method of circuit integration is not limited to LSI. Integration may be implemented with a dedicated circuit or a general-purpose processor. A field programmable gate array (FPGA) that can be programmed after manufacturing LSI or a reconfigurable processor that allows reconfiguration of the connections and settings of circuit cells inside the LSI may be used.

Moreover, in the embodiment, the structural components may be each configured using dedicated hardware or may be each realized by executing a software program suitable for the structural component. Each of the structural components may be implemented by a program executing unit, such as a CPU or a processor, reading and executing a software program recorded on a recording medium, such as a hard disk or a semiconductor memory.

Moreover, the present disclosure may be realized as various method executed by the video display device and the generation device.

Moreover, the division of the functional blocks in the block diagram is one example, and functional blocks may be achieved as one functional block, one functional block may be divided into blocks, or some of functions may be transferred to other functional blocks. Further, single hardware or software may process similar functions of functional blocks, in parallel or by time division.

Moreover, the order in which the steps are performed in the flow chart is one example for specifically describing the present disclosure, and order other than the above order may be used. Further, some of the steps may be performed simultaneously (in parallel) with other steps.

Although the video display device and generation device according to one or more aspects have been described according to the embodiment, the present disclosure is not limited to the embodiment. Forms obtained by various modifications to the embodiment that can be conceived by a person skilled in the art as well as forms realized by optionally combining structural components and functions in the embodiment which are within the scope of the essence of the present invention are included in the present invention.

INDUSTRIAL APPLICABILITY

The present disclosure is applicable to video display devices and generation devices.

The invention claimed is:

1. A video display device, comprising:
   an obtainer that obtains video data including a video and dynamic luminance characteristics indicating a time-dependent change in luminance characteristics of the video;
   a tone mapping processor that, in the case where a luminance region having a luminance less than or equal to a first luminance is defined as a low luminance region, and a luminance region having a luminance exceeding the first luminance is defined as a high luminance region, (i) performs first tone mapping using first conversion characteristics when first luminance characteristics exceed a predetermined threshold value, and (ii) performs second tone mapping using second conversion characteristics when the first luminance characteristics are less than or equal to the predetermined threshold value, the first luminance characteristics being included in the dynamic luminance characteristics and indicating the number of pixels having luminances less than or equal to a second luminance among pixels included in the low luminance region in one frame of the video, the first tone mapping maintaining the luminances less than or equal to the second luminance, the second tone mapping decreasing the luminances less than or equal to the second luminance; and
   a display that displays a video obtained as a result of the first tone mapping or the second tone mapping.

2. The video display device according to claim 1,
wherein the tone mapping processor uses, as the second conversion characteristics for use in the second tone mapping, a conversion curve having a slope that is less than 1 at the luminances less than or equal to the second luminance.

3. The video display device according to claim 1,
wherein the tone mapping processor uses, as the second conversion characteristics for use in the second tone mapping, a conversion curve that causes a proportion of the luminances less than or equal to the second luminance to the second luminance to decrease with a decrease in a value indicated by the first luminance characteristics.

4. The video display device according to claim 1,
wherein in the first tone mapping, the tone mapping processor uses:
  (i) a conversion curve as the first conversion characteristics when a third luminance is closer to the second luminance than to a maximum luminance in the one frame, the third luminance being a luminance when a cumulative value from 0 reaches a value of a first proportion that is at least 90% of a total number of pixels in a histogram of maxRGB values of each pixel included in the one frame, the conversion curve having a slope from the second luminance to the third luminance greater than a slope in a range of luminances exceeding the third luminance; and
  (ii) a conversion curve as the first conversion characteristics when the third luminance is closer to the maximum luminance than to the second luminance, the conversion curve having the slope from the second luminance to the third luminance less than the slope in the range of luminances exceeding the third luminance.

5. The video display device according to claim 1,
wherein the tone mapping processor uses, as the first conversion characteristics for use in the first tone mapping:
  a conversion curve having a minimum value of a luminance range as a knee-point when the second luminance is greater than a maximum value of the luminance range, the luminance range being preset to determine the knee-point;
  a conversion curve having the second luminance as a knee-point when the second luminance is located in the luminance range; and
  a conversion curve having the maximum value of the luminance range as a knee-point when the second luminance is less than the minimum value of the luminance range.

6. The video display device according to claim 1,
wherein the second luminance is 100 nit.

7. A video display method for use in a video display device, the video display method comprising:
  obtaining video data including a video and dynamic luminance characteristics indicating a time-dependent change in luminance characteristics of the video;
  in the case where a luminance region having a luminance less than or equal to a first luminance is defined as a low luminance region, and a luminance region having a luminance exceeding the first luminance is defined as a high luminance region, (i) performing first tone mapping using first conversion characteristics when first luminance characteristics exceed a predetermined threshold value, and (ii) performing second tone mapping using second conversion characteristics when the first luminance characteristics are less than or equal to the predetermined threshold value, the first luminance characteristics being included in the dynamic luminance characteristics and indicating the number of pixels having luminances less than or equal to a second luminance among pixels included in the low luminance region in one frame of the video, the first tone mapping maintaining the luminances less than or equal to the second luminance, the second tone mapping decreasing the luminances less than or equal to the second luminance; and
  displaying a video obtained as a result of the first tone mapping or the second tone mapping.

* * * * *